(12) United States Patent
Tokiwa

(10) Patent No.: US 10,246,525 B2
(45) Date of Patent: Apr. 2, 2019

(54) PROCESS FOR PRODUCING CONJUGATED DIENE POLYMER

(71) Applicant: Asahi Kasei Kabushiki Kaisha, Tokyo (JP)

(72) Inventor: Tetsuji Tokiwa, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 0 days.

(21) Appl. No.: 15/506,495

(22) PCT Filed: Sep. 7, 2015

(86) PCT No.: PCT/JP2015/075307
§ 371 (c)(1),
(2) Date: Feb. 24, 2017

(87) PCT Pub. No.: WO2016/039284
PCT Pub. Date: Mar. 17, 2016

(65) Prior Publication Data
US 2017/0260301 A1  Sep. 14, 2017

(30) Foreign Application Priority Data

Sep. 9, 2014 (JP) ................. 2014-183614
Dec. 17, 2014 (JP) ................. 2014-254933

(51) Int. Cl.
| | |
|---|---|
| *C08C 2/02* | (2006.01) |
| *B29B 13/06* | (2006.01) |
| *C08F 36/00* | (2006.01) |
| *C08F 6/10* | (2006.01) |
| *C08F 8/00* | (2006.01) |
| *B29B 7/48* | (2006.01) |
| *C08C 19/22* | (2006.01) |
| *C08C 19/25* | (2006.01) |
| *C08J 3/00* | (2006.01) |
| *B29K 9/00* | (2006.01) |

(52) U.S. Cl.
CPC .......... *C08C 2/02* (2013.01); *B29B 7/48* (2013.01); *B29B 13/06* (2013.01); *C08C 19/22* (2013.01); *C08C 19/25* (2013.01); *C08F 6/10* (2013.01); *C08F 8/00* (2013.01); *C08F 36/00* (2013.01); *C08J 3/005* (2013.01); *B29K 2009/00* (2013.01); *C08J 2309/06* (2013.01)

(58) Field of Classification Search
None
See application file for complete search history.

(56) References Cited

U.S. PATENT DOCUMENTS

| | | | | |
|---|---|---|---|---|
| 2003/0199669 | A1* | 10/2003 | Saito | C08K 3/36 528/393 |
| 2006/0211825 | A1 | 9/2006 | Schauder et al. | |
| 2013/0285271 | A1* | 10/2013 | Kim | B29C 47/762 264/46.1 |
| 2015/0218335 | A1* | 8/2015 | Kirchhoff | B29C 47/0813 521/44.5 |

FOREIGN PATENT DOCUMENTS

| | | |
|---|---|---|
| EP | 2206732 A1 | 7/2010 |
| JP | S60-243102 A | 12/1985 |
| JP | H09-038969 A | 2/1997 |
| JP | H11-198136 A | 7/1999 |
| JP | 2006-026949 A | 2/2006 |
| JP | 2011-116025 A | 6/2011 |
| JP | 2013-043977 A | 3/2013 |
| JP | 2013-540628 A | 11/2013 |
| WO | 98/02467 A2 | 1/1998 |

OTHER PUBLICATIONS

International Search Report issued in corresponding International Patent Application No. PCT/JP2015/075307 dated Dec. 1, 2015.
Supplementary European Search Report issued in counterpart European Patent Application No. 15840086.1 dated Aug. 25, 2017.
International Preliminary Report on Patentablity and Written Opinion issued in corresponding International Patent Application No. PCT/JP2015/075307 dated Mar. 14, 2017.

* cited by examiner

*Primary Examiner* — Robert C Boyle
(74) *Attorney, Agent, or Firm* — Morgan, Lewis & Bockius LLP

(57) ABSTRACT

The present invention provides a process for producing a conjugated diene polymer, the process including a production step of producing a conjugated diene polymer solution containing a conjugated diene polymer and a solvent, and a devolatilization step of heating the conjugated diene polymer solution while conveying the conjugated diene polymer solution with an apparatus having rotary twin screws, thereby devolatilizing the solvent, in which a motor current value of the screw in the devolatilization step and a motor current value of the screw under no load satisfy a predetermined relational expression.

14 Claims, No Drawings

PROCESS FOR PRODUCING CONJUGATED DIENE POLYMER

TECHNICAL FIELD

The present invention relates to a process for producing a conjugated diene polymer.

BACKGROUND ART

A production step of a conjugated diene polymer obtained through solution polymerization generally includes a step of bringing a conjugated diene polymer solution obtained after polymerization into contact with a large amount of steam, thereby evaporating a solvent. Moreover, there is also proposed a method for devolatilizing a solvent through heating while conveying a conjugated diene polymer solution with a screw using a screw type apparatus such as a biaxial extruder or kneader without bringing steam into direct contact with the conjugated diene polymer solution. For example, Patent Literature 1 discloses a devolatilization apparatus and a devolatilization method each using an extruder. Moreover, Patent Literature 2 discloses a method for extruding a resin at a low temperature and at a low pressure with an extrusion apparatus having two screws by injecting a supercritical fluid in devolatilizing a solvent.

CITATION LIST

Patent Literature

Patent Literature 1: Japanese Patent Laid-Open No. 2011-116025
Patent Literature 2: Japanese Patent Laid-Open No. 2006-26949

SUMMARY OF INVENTION

Technical Problem

However, the step of evaporating a solvent by bringing the solvent into contact with a large amount of steam has problems such that a large amount of steam is consumed and therefore much energy is required, that there are many steps required for removing moisture left in a polymer and therefore the energy consumption in the steps is large, and that moisture left in a final product undergoes dew condensation in a container during transportation.

Moreover, in the method described in Patent Literature 1, shear heat generation originating from the power of the screw type apparatus is large, and therefore gel of the conjugated diene polymer is generated in a large amount. Furthermore, even in the method described in Patent Literature 2, suppression of the shear heat generation originating from the power of the screw type apparatus is insufficient, and the generation of gel cannot sufficiently be suppressed.

Accordingly, the present invention intends to provide a process for producing a conjugated diene polymer, the process capable of devolatilizing a solvent until the amount of a volatilization residue becomes appropriate while suppressing the generation of gel.

Solution to Problem

The present inventors have conducted diligent studies to solve the problems of the conventional techniques and have completed the present invention by finding that when a process for producing a conjugated diene polymer, the process including a predetermined step in which a motor current value of a screw falls within a particular range, is used, a conjugated diene polymer in which a solvent is devolatilized until the amount of a volatilization residue becomes appropriate while suppressing the generation of gel can be obtained.

The present invention is as follows.

[1]
A process for producing a conjugated diene polymer, the process comprising:
a production step of producing a conjugated diene polymer solution comprising a conjugated diene polymer and a solvent; and
a devolatilization step of heating the conjugated diene polymer solution while conveying the conjugated diene polymer solution with an apparatus comprising rotary twin screws, thereby devolatilizing the solvent,
wherein a motor current value of the screw in the devolatilization step and a motor current value of the screw under no load satisfy following relational expression (1):

$$1.05 \leq ((I_1)/(I_0)) \leq 2.00 \qquad (1)$$

wherein $I_1$ represents the motor current value [A] of the screw in the devolatilization step and $I_0$ represents the motor current value [A] of the screw under no load.

[2]
The process for producing the conjugated diene polymer according to [1], wherein the conjugated diene polymer solution comprises 5.0% by mass or more and 95% by mass or less of the conjugated diene polymer based on the total amount of the conjugated diene polymer solution.

[3]
The process for producing the conjugated diene polymer according to [1] or [2], wherein the conjugated diene polymer solution comprises 5.0 parts by mass or more and 100 parts by mass or less of oil based on 100 parts by mass of the conjugated diene polymer.

[4]
The process for producing the conjugated diene polymer according to any of [1] to [3], wherein two or more of the apparatuses each comprising twin screws are used in the devolatilization step.

[5]
The process for producing the conjugated diene polymer according to any of [1] to [4], wherein the conjugated diene polymer has a weight average molecular weight of 100000 or higher and 2000000 or lower.

[6]
The process for producing the conjugated diene polymer according to any of [1] to [5], wherein the conjugated diene polymer comprises 1.0% by mass or more and 99% by mass or less of a component having a molecular weight of 1000000 or higher based on the total amount of the conjugated diene polymer.

[7]
The process for producing the conjugated diene polymer according to any of [1] to [6], wherein an average residence time in the devolatilization step is 10 seconds or longer and 300 seconds or shorter.

[8]
The process for producing the conjugated diene polymer according to any of [1] to [7], wherein:
a ratio of a screw length to a screw diameter in the apparatus is 4.0 or more and 12 or less; and in the devolatilization step, an inner volume of the apparatus and an amount of the solvent volatilizing per unit time satisfy following relational expression (2):

$$1.0 \leq ((V_A)/(V_0)) \leq 50 \tag{2}$$

wherein $(V_0)$ represents the inner volume [L] of the apparatus and $(V_A)$ represents the amount [L] of the solvent volatilizing per unit time [h].

[9]

The process for producing the conjugated diene polymer according to any of [1] to [8], wherein the devolatilization step is a step of devolatilizing the solvent until the content of the solvent reaches 5.0% by mass or less based on the total amount of the conjugated diene polymer obtained.

[10]

The process for producing the conjugated diene polymer according to any of [1] to [9], wherein the conjugated diene polymer is modified with a compound having at least one functional group selected from the group consisting of epoxy groups and alkoxysilyl groups.

[11]

The process for producing the conjugated diene polymer according to [10], wherein the compound is at least one compound selected from the group consisting of compounds represented by following general formula (3) and compounds represented by following general formula (4):

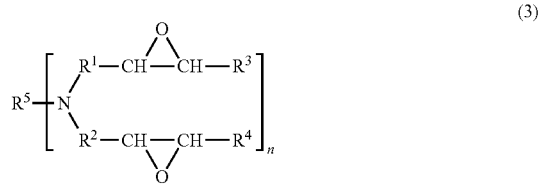

wherein $R^1$ and $R^2$ each independently represent an alkyl group having 1 to 10 carbon atoms or an alkyl group having 1 to 10 carbon atoms and having at least one functional group selected from the group consisting of ether groups and tertiary amine groups, $R^3$ and $R^4$ each independently represent a hydrogen atom, an alkyl group having 1 to 20 carbon atoms, or an alkyl group having 1 to 20 carbon atoms and having at least one functional group selected from the group consisting of ether groups and tertiary amine groups, $R^5$ represents an alkyl group having 1 to 20 carbon atoms or an alky group having 1 to 20 carbon atoms and having at least one functional group selected from the group consisting of ether groups, tertiary amine groups, epoxy groups, carbonyl groups and halogens, and n represents an integer of 1 to 6; and

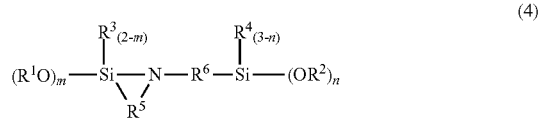

wherein $R^1$ and $R^2$ each independently represent an alkyl group having 1 to 20 carbon atoms or an aryl group having 6 to 20 carbon atoms, $R^3$ and $R^4$ each independently represent an alkyl group having 1 to 20 carbon atoms, $R^5$ represents an alkyl group having 1 to 6 carbon atoms and forms a five or more-membered cyclic structure with an adjacent nitrogen atom and an adjacent silicon atom, $R^6$ represents an alkyl group having 1 to 20 carbon atoms, an alkyl group having 1 to 20 carbon atoms, not having an active hydrogen atom, and substituted with a heteroatom, or an organosubstituted silyl group, m represents an integer of 1 or 2, and n represents an integer of 2 or 3.

Advantageous Effects of Invention

According to the process for producing a conjugated diene polymer of the present invention, a conjugated diene polymer in which a solvent is devolatilized until the amount of a volatilization residue becomes appropriate while suppressing generation of gel can be obtained.

DESCRIPTION OF EMBODIMENTS

Hereinafter, the embodiments for carrying out the present invention (hereinafter, referred to as "present embodiments") will be described in detail. It is to be noted that the present embodiments below are examples for describing the present invention and the present invention is not limited by the embodiments below. The present invention can appropriately be modified and carried out within a scope of the gist thereof.

[Process for Producing Conjugated Diene Polymer]

The process for producing a conjugated diene polymer according to the present embodiments include: a production step of producing a conjugated diene polymer solution containing a conjugated diene polymer and a solvent; and a devolatilization step of heating the conjugated diene polymer solution while conveying the conjugated diene polymer solution with an apparatus having rotary twin screws, thereby devolatilizing the solvent. Moreover, a motor current value (hereinafter, referred to as "motor current value $(I_1)$", or also simply referred to as "$(I_1)$") of the screw in the devolatilization step and a motor current value (hereinafter, referred to as "motor current value $(I_0)$", or also simply referred to as "$(I_0)$") of the screw under no load satisfy the following relational expression (1).

$$1.05 \leq ((I_1)/(I_0)) \leq 2.0 \tag{1}$$

In the expression (1), $I_1$ represents the motor current value [A] of the screw in the volatilization step and $I_0$ represents the motor current value [A] of the screw under no load.

[Production Step]

The production step according to the present embodiments is a step for producing a conjugated diene polymer solution containing a conjugated diene polymer and a solvent. The method for producing a conjugated diene polymer solution is not particularly limited, and examples thereof include a method in which a monomer (hereinafter, referred to as "conjugated diene monomer") as a raw material for the conjugated diene polymer is dissolved in a solvent for polymerization reaction described later and polymerized through solution polymerization, and publicly known methods.

[Conjugated Diene Polymer Solution]

The conjugated diene polymer solution according to the present embodiments means a conjugated diene polymer solution containing a conjugated diene polymer and a solvent. Specific examples thereof include a solution in which a conjugated diene polymer is present in a residual solvent as a result of polymerizing a conjugated diene monomer through solution polymerization. The conjugated diene polymer in the conjugated diene polymer solution is not necessarily in a state where the whole conjugated diene polymer is dissolved, and a state where the whole conjugated diene polymer is dissolved, a state where part of the conjugated diene polymer is dissolved, a state where the conjugated diene polymer is not dissolved but is dispersed in a solvent, etc. are included in the present embodiments.
<Conjugated Diene Polymer>

The conjugated diene polymer according to the present embodiments may be a homopolymer obtained by polymerizing a conjugated diene monomer. The conjugated diene monomer is not particularly limited as long as the conjugated diene monomer is a polymerizable monomer, and examples thereof include 1,3-butadiene, isoprene, 2,3-dimethyl-1,3-butadiene, 1,3-pentadiene, 3-methyl-1,3-pentadiene, 1,3-heptadiene, and 1,3-hexadiene. Among these, 1,3-butadiene and isoprene are preferable from the viewpoint of easiness of industrial availability. These conjugated diene monomers may be used alone or in combination of two or more.

When an allene, an acetylene, or the like is contained as an impurity in the conjugated diene monomer, there is a risk that modification reaction at a conjugated diene polymer terminal is inhibited. Therefore, it is preferable that the total concentration (mass) of these impurities contained is 200 ppm or less, more preferably 100 ppm or less, and still more preferably 50 ppm or less. It is to be noted that the concentration of these impurities contained is on a mass basis. Examples of the allene include propadiene and 1,2-butadiene. Examples of the acetylene include ethyl acetylene and vinyl acetylene.

The conjugated diene polymer according to the present embodiments may be a copolymer of the conjugated diene monomer and an aromatic vinyl monomer, or may be a homopolymer of an aromatic vinyl monomer. The aromatic vinyl monomer is not particularly limited as long as the aromatic vinyl monomer is a monomer that is copolymerizable with a conjugated diene monomer, and examples thereof include styrene, m- or p-methyl styrene, α-methyl styrene, vinyl ethylbenzene, vinyl xylene, vinyl naphthalene, diphenyl ethylene, and divinylbenzene. Among these, styrene is preferable from the viewpoint of easiness of industrial availability. These conjugated diene monomers may be used alone or in combination of two or more.

It is preferable that the amount of the bonded aromatic vinyl monomer in the conjugated diene polymer (hereinafter, also simply referred to as "the amount of the bonded aromatic vinyl") is 5.0% by mass or more and 70% by mass or less, and more preferably 10% by mass or more and 50% by mass or less based on the total amount (100% by mass) of the conjugated diene polymer. When the amount of the bonded aromatic vinyl falls within such a range, there is a tendency that the balance between a low hysteresis loss property and wet skid resistance is more excellent, and there is also a tendency that a vulcanizate of the conjugated diene polymer, the vulcanizate satisfying both wear resistance and breaking strength, is obtained. The amount of the bonded aromatic vinyl is measured according to the method of measuring the amount of the bonded styrene described in Examples mentioned later by applying the method to the measurement for the aromatic vinyl monomer that is used.

It is preferable that the amount of a vinyl bond (1,2- or 3,4-bond) in the conjugated diene bond unit in the conjugated diene polymer is 10 mol % or more and 75 mol % or less, and more preferably 13 mol % or more and 65 mol % or less. When the amount of the vinyl bond falls within such a range, there are tendencies that the balance between a low hysteresis loss property and wet skid resistance is more excellent, and that a vulcanizate of the conjugated diene polymer, the vulcanizate satisfying both wear resistance and breaking strength can be obtained. It is to be noted that, in the case where the conjugated diene polymer is a copolymer, the copolymer may be a random copolymer or a block copolymer. The amount of the vinyl bond is measured according to the method described in Examples mentioned later.

The random copolymer is not particularly limited, and examples thereof include butadiene-isoprene random copolymers, butadiene-styrene random copolymers, isoprene-styrene random copolymers, and butadiene-isoprene-styrene random copolymers. Examples of the composition distribution of each monomer in the copolymer chain include a perfect random copolymer the composition of which is similar to a statistically random composition and a tapered (gradient) random copolymer the composition distribution of which has a gradient. The bond form in the conjugated diene polymer, namely the composition of the 1-4-bond, 1,2-bond, or the like may be uniform or different depending on the molecular chain.

The block copolymer is not particularly limited, and examples thereof include type 2 block copolymers constituted by 2 blocks, type 3 block copolymers constituted by 3 blocks, and type 4 block copolymers constituted by 4 blocks. When a block constituted by an aromatic vinyl monomer such as styrene is denoted as S, and a block constituted by a conjugated diene monomer such as butadiene or isoprene and/or a block constituted by a copolymer of an aromatic vinyl monomer and a conjugated diene monomer are denoted as B, block copolymers are represented by expressions such as an S-B type 2 block copolymer, an S-B-S type 3 block copolymer, and an S-B-S-B type 4 block copolymer.

In the above-described expressions, the boundaries between respective blocks are not necessarily distinguished clearly. For example, in the case where the block B is a copolymer of an aromatic vinyl monomer and a conjugated diene monomer, the aromatic vinyl monomer in the block B may be distributed uniformly or in a tapered manner. Moreover, a plurality of portions where the aromatic vinyl monomer is distributed uniformly and/or portions where the aromatic vinyl monomer is distributed in a tapered manner may be coexisted in the block B. Furthermore, a plurality of segments each having a different aromatic vinyl monomer content may be coexisted in the block B. In the case where a plurality of blocks S and a plurality of blocks B exist in the copolymer, the molecular weight and composition structure for blocks S and for blocks B may be the same or different.
<Polymerization Initiator>

The polymerization initiator used in polymerizing a conjugated diene monomer and an aromatic vinyl monomer is not particularly limited as long as the polymerization initiator is an anionic polymerization initiator; however, alkyl compounds of a metal such as aluminum, magnesium, lithium, sodium, or potassium are preferable from the viewpoint of stability and handling properties, and, among these, organolithium is more preferable from the viewpoint of polymerization efficiency.

Examples of the organolithium include low-molecular organolithium and solubilized oligomeric organolithium. Moreover, examples of the compound in terms of the bond form between an organic group and lithium in organolithium include compounds containing a carbon-lithium bond, compounds containing a nitrogen-lithium bond, and compounds containing a tin-lithium bond.

The organolithium having a carbon-lithium bond is not particularly limited, and examples thereof include n-butyllithium, sec-butyllithium, tert-butyllithium, n-hexyllithium, benzyllithium, phenyllithium, and stilbenelithium.

The organolithium containing a nitrogen-lithium bond is not particularly limited, and examples thereof include lithium dimethylamide, lithium diethylamide, lithium dipropylamide, lithium di-n-hexylamide, lithium diisopropylamide, lithium hexamethyleneimide, lithium pyrrolidide, lithium piperidide, lithium heptamethyleneimide, and lithium morpholide.

Examples of the organolithium include not only the monoorganolithium as listed specifically above but also multifunctional organolithium. The monoorganolithium and multifunctional organolithium may be used alone or in combination thereof.

The multifunctional organolithium is not particularly limited, and examples thereof include: 1,4-dilithiobutane; a reaction product of sec-butyllithium and diisopropenylbenzene; 1,3,5-trilithiobenzene; a reaction product of n-butyllithium, 1,3-butadiene, and divinylbenzene; and a reaction product of n-butyllithium and a polyacetylene compound. Moreover, examples of the multifunctional organolithium also include the organolithium disclosed in U.S. Pat. No. 5,708,092, GB Patent 2,241,239, and U.S. Pat. No. 5,527,753. As the organolithium, n-butyllithium and sec-butyllithium are preferable from the viewpoint of easiness of industrial availability and of easiness of controlling polymerization reaction.

When the organolithium is used in polymerization, it is preferable that a solution prepared by diluting the organolithium with a hydrocarbon solvent is used for the purpose of making the handling properties and the dispersibility in a polymerization solution satisfactory.

The hydrocarbon solvent is not particularly limited, and examples thereof include C4 to C8 hydrocarbon solvents, toluene, and xylene. Furthermore, the hydrocarbon solvent may have a cyclic structure, or may have an unsaturated bond or branched structure. C5 and C6 hydrocarbon solvents are preferable because they are easy to handle in the production step in terms of the boiling point and the vapor pressure, and pentane, normal hexane, and cyclohexane are more preferable.

It is preferable that the concentration at the time when the organolithium is diluted with the hydrocarbon is 0.01% by mass or more and 1.0% by mass or less, and more preferably 0.1% by mass or more and 0.8% by mass or less from the viewpoint of the efficiency of polymerization initiation and of the uniform mixability with monomers.

<Solvent for Polymerization Reaction>

As the polymerization reaction of the conjugated diene monomer, the reaction of solution polymerization in which polymerization is conducted in a solvent (hereinafter, also referred to as "solvent for polymerization reaction") is preferable. The solvent for polymerization reaction is not particularly limited as long as a conjugated diene monomer dissolves therein, and examples thereof include hydrocarbon-based solvents such as saturated hydrocarbons and aromatic hydrocarbons. Specific examples of the solvent for polymerization reaction include: aliphatic hydrocarbons such as butane, pentane, hexane, and heptane; alicyclic hydrocarbons such as cyclopentane, cyclohexane, methylcyclopentane, and methylcyclohexane; aromatic hydrocarbons such as benzene, toluene, and xylene; and hydrocarbons consisting of a mixture thereof.

It is preferable to treat the allene and acetylene as an impurity with an organometal compound before conducting polymerization because there is a tendency that a polymer having a high concentration of active terminals is obtained and, in the case where modification reaction is conducted after polymerization, there is a tendency that a high modification rate is achieved.

<Polar Compound>

In the production step, a polar compound may be added. The polar compound can be used for randomly copolymerizing an aromatic vinyl monomer and a conjugated diene monomer, and can also be used as an vinylation agent for controlling a microstructure of a conjugated diene moiety. Moreover, the polar compound has an effect of improving the polymerization rate or the like.

The polar compound is not particularly limited, and examples thereof include: ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene, and 2,2-bis(2-oxolanyl)propane; tertiary amine compounds such as tetramethylethylenediamine, dipiperidinoethane, trimethylamine, triethylamine, pyridine, and quinuclidine; alkali metal alkoxide compounds such as potassium-t-amylate, potassium-t-butyrate, sodium-t-butyrate, and sodium amylate; and phosphine compounds such as triphenylphosphine. These polar compounds may be used alone or in combination of two or more.

The amount of the polar compound used is not particularly limited, and can be selected according to the purpose or the like, but is preferably 0.01 mol or more and 100 mol or less based on 1 mol of the polymerization initiator. Moreover, the polar compound (vinylation agent) can be used in an appropriate amount according to the desired amount of the vinyl bond as a regulator of a microstructure of a conjugated diene moiety in the polymer.

Many of the polar compounds have a randomization effect that is effective in copolymerization of a conjugated diene monomer and an aromatic vinyl monomer, and can also be used as an adjusting agent for the distribution of the aromatic vinyl monomer and as an adjusting agent for the amount of the styrene block. The method of randomizing a conjugated diene monomer and an aromatic vinyl monomer is not particularly limited, and examples thereof include a method in which part of 1,3-butadiene is intermittently added in the course of copolymerization as described in Japanese Patent Laid-Open No. 59-140211.

The polymerization temperature is not particularly limited as long as polymerization progresses at the temperature, but is preferably 0° C. or higher from the viewpoint of productivity and is preferably 120° C. or lower from the viewpoint of suppressing deactivation during polymerization.

A multifunctional aromatic vinyl monomer for controlling branching, such as divinylbenzene, may be used in the production step from the viewpoint of preventing a cold flow of the conjugated diene polymer.

<Modifying Agent>

It is preferable that an active terminal of the conjugated diene polymer obtained in the manner as mentioned above is modified with a compound (hereinafter, also referred to as "modifying agent") having at least one functional group selected from the group consisting of epoxy groups and alkoxysilyl groups.

The compound having an epoxy group is not particularly limited, and examples thereof include polyglycidyl ethers of polyhydric alcohols such as ethylene glycol diglycidyl ether and glycerin triglycidyl ether; polyglycidyl ethers of aromatic compounds having 2 or more phenol groups such as 4,4'-diglycidyl-bisphenol A; polyepoxy compounds such as 1,4-diglycidylbenzene, 1,3,5-triglycidylbenzene, and polyepoxidized liquid polybutadiene; epoxy group-containing tertiary amines such as 4,4'-diglycidyl-diphenylmethylamine and 4,4'-diglycidyl-dibenzylmethylamine; and diglycidylamino compounds such as diglycidyl aniline, diglycidyl ortho-toluidine, tetraglycidyl meta-xylenediamine, tetraglycidyl amino diphenylmethane, tetraglycidyl-p-phenylenediamine, diglycidyl amino methylcyclohexane, and tetraglycidyl-1,3-bisaminomethylcyclohexane.

Among the compounds having an epoxy group mentioned above, multifunctional compounds having 2 or more epoxy groups and at least one nitrogen-containing group within a molecule are preferable, compounds represented by the general formula (3) mentioned later are more preferable, and multifunctional compounds having a diglycidylamino group are still more preferable. Moreover, the multifunctional compound having a diglycidylamino group has 2 or more epoxy groups within a molecule, preferably 3 or more epoxy groups, and more preferably 4 or more epoxy groups.

The compound having an alkoxysilyl group is not particularly limited, and examples thereof include dimethoxy dimethylsilane, diethoxy dimethylsilane, diethoxy diethylsilane, triphenoxy vinylsilane, trimethoxy vinylsilane, triethoxy vinylsilane, tri(2-methylbutoxy)ethylsilane, tri(2-methylbutoxy)vinylsilane, triphenoxy phenylsilane, tetraphenoxysilane, tetraethoxysilane, tetramethoxysilane, tetrakis(2-ethylhexyloxy)silane, phenoxydivinyl chlorosilane, methoxydiethyl chlorosilane, diphenoxymethyl chlorosilane, diphenoxyphenyl iodosilane, diethoxymethyl chlorosilane, dimethoxyethyl chlorosilane, triethoxy chlorosilane, triphenoxy chlorosilane, tris(2-ethylhexyloxy) chlorosilane, phenoxymethyl dichlorosilane, methoxyethyl dichlorosilane, ethoxymethyl dichlorosilane, phenoxyphenyl diiodosilane, phenoxy dichlorosilane, dimethoxy dichlorosilane, and bis(2-methylbuthoxy)dibromosilane.

Among the compounds having an alkoxysilyl group, compounds having an N atom and a plurality of alkoxysilyl groups within a molecule are preferable, and examples thereof include 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(5-trimethoxysilylpentyl)-1-aza-2-silacycloheptane, 2,2-dimethoxy-1-(3-dimethoxymethylsilylpropyl)-1-aza-2-silacyclopentane, 2,2-diethoxy-1-(3-diethoxyethylsilylpropyl)-1-aza-2-silacyclopentane, 2-methoxy, 2-methyl-1-(3-trimethoxysilylpropyl)-1-aza-2-silacyclopentane, 2-ethoxy, 2-ethyl-1-(3-triethoxysilylpropyl)-1-aza-2-silacyclopentane, 2-methoxy, 2-methyl-1-(3-dimethoxymethylsilylpropyl)-1-aza-2-silacyclopentane, 2-ethoxy, 2-ethyl-1-(3-diethoxyethylsilylpropyl)-1-aza-2-silacyclopentane, 1-[3-(trialkoxysilyl)-propyl]-4-alkylpiperazines, 1-[3-(alkyldialkoxysilyl)-propyl]-4-alkylpiperazines, 1-[3-(trialkoxysilyl)-propyl]-3-alkylimidazolidines, 1-[3-(alkyldialkoxysilyl)-propyl]-3-alkylimidazolidines, 1-[3-(triakloxysilyl)-propyl]-3-alkylhexahydropyrimidines, 1-[3-(alkyldialkoxysilyl)-propyl]-3-alkylhexahydropyrimidines, 3-[3-(trialkoxysilyl)-propyl]-1-alkyl-1,2,3,4-tetrahydropyrimidines, 3-[3-(alkyldialkoxysilyl)-propyl]-1-alkyl-1,2,3,4-tetrahydropyrimidines, 1-[3-(triethoxysilyl)-propyl]-4-methylpiperazine, 1-[3-(diethoxyethylsilyl)-propyl]-4-methylpiperazine, 1-[3-(trimethoxysilyl)-propyl]-3-methylimidazolidine, 1-[3-(diethoxyethylsilyl)-propyl]-3-ethylimidasolidine, 1-[3-(triethoxysilyl)-propyl]-3-methylhexahydropyrimidine, 1-[3-(dimethoxymethylsilyl)-propyl]-3-methylhexahydropyrimidine, 3-[3-(tributhoxysilyl)-propyl]-1-methyl-1,2,3,4-tetrahydropyrimidine, 3-[3-(dimethoxymethylsilyl)-propyl]-1-ethyl-1,2,3,4-tetrahydropyrimidine, 1-(2-ethoxyethyl)-3-[3-(trimethoxysilyl)-propyl]-imidazolidine, and (2-{3-[3-(trimethoxysilyl)-propyl]-tetrahydropyrimidine-1-yl}-ethyl) dimethylamine. Among these, 1-[3-(triethoxysilyl)-propyl]-4-methylpiperazine, 2,2-dimethoxy-1-(3-trimethoxysilylpropyl)-1-aza-2-silacyclopentane, and 2,2-diethoxy-1-(3-triethoxysilylpropyl)-1-aza-2-silacyclopentane are preferable from the viewpoint of the reactivity and interactivity of a functional group of the compound having an alkoxysilyl group and an inorganic filler such as silica and from the viewpoint of processability.

Among the above-mentioned compounds having an alkoxysilyl group, compounds having a nitrogen atom and 2 or more alkoxysilyl groups within a molecule are more preferable, and compounds represented by the general formula (4) mentioned later are more preferable.

It is preferable that the modifying agent is at least one compound selected from the group consisting of the compounds represented by the following general formula (3) and compounds represented by the following general formula (4).

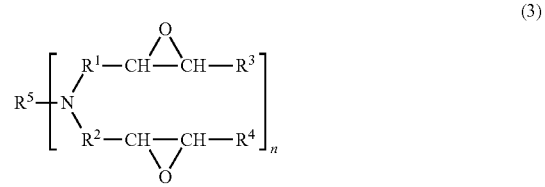

(3)

In the formula (3), $R^1$ and $R^2$ each independently represent an alkyl group having 1 to 10 carbon atoms or an alkyl group having 1 to 10 carbon atoms and having at least functional group selected from the group consisting of ether groups and tertiary amine groups, $R^3$ and $R^4$ each independently represent a hydrogen atom, an alkyl group having 1 to 20 carbon atoms, or an alkyl group having 1 to 20 carbon atoms and having at least one functional group selected from the group consisting of ether groups and tertiary amine groups, $R^5$ represents an alkyl group having 1 to 20 carbon atoms or an alky group having 1 to 20 carbon atoms and having at least one functional group selected from the group consisting of ether groups, tertiary amine groups, epoxy groups, carbonyl groups and halogens, and n represents an integer of 1 to 6.

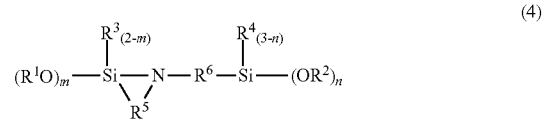

(4)

In the formula (4), $R^1$ and $R^2$ each independently represent an alkyl group having 1 to 20 carbon atoms or an aryl group having 6 to 20 carbon atoms, $R^3$ and $R^4$ each independently represent an alkyl group having 1 to 20 carbon atoms, $R^5$ represents an alkyl group having 1 to 6 carbon atoms and forms five or more-membered cyclic structure with an adjacent nitrogen atom and an adjacent silicon atom, $R^6$ represents an alkyl group having 1 to 20 carbon atoms, an alkyl group having 1 to 20 carbon atoms, not having an active hydrogen atom, and substituted with a heteroatom, or an organosubstituted silyl group, m represents an integer of 1 or 2, and n represents an integer of 2 or 3.

The compound represented by the general formula (3) is not particularly limited, and examples thereof include tetraglycidyl-p-phenylenediamine, diglycidyl aminomethylcyclohexane, and tetraglycidyl-1,3-bisaminomethylcyclohexane.

The compound represented by the general formula (4) is not particularly limited, and examples thereof include 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(5-trimethoxysilylpentyl)-1-aza-2-silacycloheptane, 2,2-dimethoxy-1-(3-dimethoxymethylsilylpropyl)-1-aza-2-silacyclopentane, 2,2-diethoxy-1-(3-diethoxyethylsilylpropyl)-1-aza-2-silacyclopentane, 2-methoxy, 2-methyl-1-(3-trimethoxysilylpropyl)-1-aza-2-silacyclopentane, 2-ethoxy, 2-ethyl-1-(3-triethoxysilylpropyl)-1-aza-2-silacyclopentane, 2-methoxy, 2-methyl-1-(3-dimethoxymethylsilylpropyl)-1-aza-2-silacyclopentane, 2-ethoxy, and 2-ethyl-1-(3-diethoxyethylsilylpropyl)-1-aza-2-silacyclopentane. Among these, the compounds represented by the general formula (4) where m represents 2 and n represents 3 are more preferable from the viewpoint of the reactivity and interactivity of a functional group of the modifying agent and an inorganic filler such as silica and from the viewpoint of processability, and 2,2-dimethoxy-1-(3-trimethoxysilylpropyl)-1-aza-2-silacyclopentane and 2,2-diethoxy-1-(3-triethoxysilylpropyl)-1-aza-2-silacyclopentane are still more preferable.

A quencher, a neutralizing agent, or the like may be added to the reaction solution as necessary after completion of polymerization. Examples of the quencher include: water; and alcohols such as methanol, ethanol, and isopropanol. Examples of the neutralizing agent include: carboxylic acids such as stearic acid, oleic acid, and Versatic acids; aqueous solutions of an inorganic acid; and a carbonic acid gas.

It is preferable to add a stabilizer for rubber to the conjugated diene polymer obtained from the viewpoint of preventing generation of gel after polymerization and from the viewpoint of improving stability during processing. Publicly known stabilizers for rubber can be used, but, for example, antioxidants such as 2,6-di-tert-butyl-4-hydroxytoluene (BHT), n-octadecyl-3-(4'-hydroxy-3',5'-di-tert-butylphenol)propionate, and 2-methyl-4,6-bis[(octylthio)methyl]phenol are preferable.

It is preferable that the weight average molecular weight (Mw) of the conjugated diene polymer is 100000 or higher and 2000000 or lower in consideration of the processability and physical properties. Moreover, the weight average molecular weight is more preferably 200000 or higher, still more preferably 250000 or higher, and even still more preferably 300000 or higher. Furthermore, the weight average molecular weight is more preferably 1800000 or lower, still more preferably 1500000 or lower, even still more preferably 1000000 or lower, and even still more further preferably 500000 or lower.

It is preferable that the molecular weight distribution (Mw/Mn) of the conjugated diene polymer is 1.02 or more and 6.0 or less, more preferably 1.05 or more and 5.0 or less, and still more preferably 1.07 or more and 4.0 or less. When the molecular weight distribution is 6.0 or less, there is a tendency that the low hysteresis loss property is satisfactory. Moreover, when the molecular weight distribution is 1.02 or more, there is a tendency that the mixability and processability of a silica blend are satisfactory. Furthermore, it is more preferable that the molecular weight distribution is 1.5 or more and 3.0 or less, and still more preferably 1.7 or more and 2.5 or less from the viewpoint of operability in the devolatilization step. It is to be noted that the molecular weight distribution is a ratio (Mw/Mn) of the weight average molecular weight (Mw) to the number average molecular weight (Mn).

Moreover, the weight average molecular weight and number average molecular weight are determined by gel permeation chromatography (hereinafter, denoted as "GPC") with a calibration formula using standard polystyrene samples, and are measured according to the method described in detail in Examples.

It is preferable that the conjugated diene polymer has 1.0% by mass or more and 99% by mass or less of a component having a molecular weight of 1000000 or higher, more preferably 5.0% by mass or more and 70% by mass or less, and still more preferably 10% by mass or more and 50% by mass or less based on the total amount (100% by mass) of the conjugated diene polymer from the viewpoint of wear resistance and strength when a silica blend is prepared. Measurement for the component having a molecular weight of 1000000 or higher in the conjugated diene polymer is conducted according to the method described in Examples.

It is preferable that the Mooney viscosity of the conjugated diene polymer is 20 or higher and 120 or lower, more preferably 30 or higher and 110 or lower, and still more preferably 40 or higher and 100 or lower. When the Mooney viscosity is 120 or lower, there is a tendency that the mixability and processability of a silica blend is satisfactory. Moreover, when the Mooney viscosity is 20 or higher, there is a tendency that physical properties of a vulcanizate are satisfactory. The Mooney viscosity is measured by the method described in Examples mentioned later.

<Oil>

It is preferable that the conjugated diene polymer solution according to the present embodiments further contains oil. The oil is not particularly limited, and examples thereof include aromatic-based, naphthene-based, and paraffin-based oils, RAE (Residual Aromatic Extracts), MES (Mild Extracted Solvates), and T-DAE (Treated Distilled Aromatic Extracts), and, among them, high-boiling point oils having a boiling point of 250° C. or higher are more preferable.

These oils are left with the conjugated diene polymer without being devolatilized even when the solvent is devolatilized from the conjugated diene polymer solution through the devolatilization step mentioned later, and have an effect of improving processability when the conjugated diene polymer is mixed and processed with other materials. These oils are generally called as rubber extender oil.

In the case where the oil is contained in the conjugated diene polymer solution, it is preferable that the conjugated diene polymer solution contains 5.0 parts by mass or more and 100 parts by mass or less of the oil based on 100 parts by mass of the conjugated diene polymer contained in the conjugated diene polymer solution. When 5 parts by mass or more of the oil is contained, there is a tendency that an effect of improving processability is exhibited, and when 100 parts by mass or less of the oil is contained, there is a tendency that mechanical properties of a vulcanizate of the conjugated diene polymer is excellent. The content of the oil is more preferably 10 parts by mass or more, and still more preferably 15 parts by mass or more. Moreover, the content of the oil is more preferably 50 parts by mass or less, and still more preferably 40 parts by mass or less.

In the present embodiments, the conjugated diene polymer solution is produced, for example, by polymerizing a conjugated diene monomer in a solvent as mentioned above.

Moreover, the conjugated diene polymer solution may be produced through a step of devolatilizing a solvent by a method other than the devolatilization step mentioned later, and may be condensed by means of a method such as, for example, flash drying after polymerization.

<Solvent>

The solvent according to the present embodiments is not limited to the above-mentioned solvent for polymerization reaction, and examples thereof include the same solvents as the solvents for polymerization reaction mentioned above. Examples of the solvent include hydrocarbon-based solvents such as saturated hydrocarbons and aromatic hydrocarbons. Specific examples of the solvent include: aliphatic hydrocarbons such as butane, pentane, hexane, and heptane; alicyclic hydrocarbons such as cyclopentane, cyclohexane, methylcyclopentane, and methylcyclohexane; aromatic hydrocarbons such as benzene, toluene, and xylene; and hydrocarbons consisting of a mixture thereof.

The conjugated diene polymer solution may further contain: a solvent for diluting an initiator or the like; a polar compound added in the polymerization step; a quencher added when polymerization is completed; a neutralizing agent; a stabilizer for rubber; an antioxidant; and so on. Besides, the conjugated diene polymer solution may be prepared by mixing the conjugated diene polymer with a solvent that is capable of dissolving the conjugated diene polymer. It is to be noted that the conjugated diene polymer may be dissolved in a solvent or may be separated in the conjugated diene polymer solution.

It is preferable that the conjugated diene polymer solution contains 1.0% by mass or more and 99% by mass or less of a solvent, more preferably 30% by mass or more and 93% by mass or less, and still more preferably 50% by mass or more and 90% by mass or less based on the total amount (100% by mass) of the conjugated diene polymer solution.

It is preferable that the conjugated diene polymer solution contains 5.0% by mass or more and 95% by mass or less of a conjugated diene polymer, more preferably 7.0% by mass or more and 50% by mass or less, and still more preferably 10% by mass or more and 30% by mass or less based on the total amount (100% by mass) of the conjugated diene polymer solution from the viewpoint of fluidity of the conjugated diene polymer solution.

The viscosity of the conjugated diene polymer solution is not particularly limited, but is preferably 0.01 Pa·s or higher and 100,000 Pa·s or lower from the viewpoint of the handling properties during supply, and is more preferably 10 Pa·s or higher and 10,000 Pa·s or lower from the viewpoint of conveyability with a screw.

[Devolatilization Step]

In the devolatilization step according to the present embodiments, the conjugated diene polymer solution produced in the production step mentioned above is heated while being conveyed with an apparatus having rotary twin screws, thereby devolatilizing the solvent contained in the conjugated diene polymer solution. Moreover, the motor current value of the screw in the devolatilization step and the motor current value of the screw under no load satisfy the following relational expression (1).

$$1.05 \leq ((I_1)/(I_0)) \geq 2.00 \tag{1}$$

In the expression (1), $I_1$ represents the motor current value [A] of the screw in the devolatilization step and $I_0$ represents the motor current value [A] of the screw under no load.

Through the devolatilization step according to the present embodiments, a conjugated diene polymer in which a solvent is devolatilized until the amount of a volatilization residue becomes appropriate while suppressing generation of gel can be obtained. The devolatilized conjugated diene polymer may contain the solvent as long as the amount of the volatilization residue is appropriate. It is to be noted that the appropriate amount of the volatilization residue specifically means that the amount is around the same as the amount of the volatilization residue contained in conjugated diene polymers given in Examples mentioned later. Moreover, the appearance of the devolatilized conjugated diene polymer may be any of a solid form, a powder form, and a liquid form.

The step of devolatilizing a solvent may include only a devolatilization step, or may include steps of devolatilizing the solvent by another method before and after the devolatilization step that follows the production step. Furthermore, the conjugated diene polymer solution may be obtained by conducting, prior to the production step, a step of devolatilizing a solvent by another method other than the devolatilization step, and then conducting the production step mentioned above.

<Apparatus Having Twin Screws>

The apparatus having twin screws is not particularly limited, and examples thereof include a screw extruder for use in kneading a resin, a screw kneader, and apparatuses having a structure similar to these. Particularly, it is preferable that the number of screws of an extruder is 2.

In the step of devolatilizing a solvent by another method other than the devolatilization step, the apparatus for devolatilizing the solvent may be used before and after the apparatus having twin screws is used as the devolatilization of the conjugated diene polymer solution progresses.

In the devolatilization step, it is preferable to use two or more apparatuses each having twin screws from the viewpoint of the amount of the volatilization residue in the devolatilized conjugated diene polymer. Examples of this case include a method in which two or more apparatuses having twin screws are connected in series to feed the conjugated diene polymer solution continuously, and a method in which the conjugated diene polymer solution is treated in a batch-wise by each of the apparatuses; however, the method of feeding the conjugated diene polymer solution continuously is more preferable in terms of production efficiency. Examples of the apparatus for continuously transferring the conjugated diene polymer solution include pumps such as a gear pump, screw type apparatuses such as a biaxial extruder, and conveyors. In the case where the devolatilization is continuously conducted connecting two or more apparatuses, the condition of devolatilization such as temperature or pressure may be different for each apparatus. Generally, the apparatuses that can take a larger heat transfer area are more preferable because the heating rate determines the rate of the devolatilization step at an early stage of condensation. Therefore, it is also more preferable that the inside of the screw is made hollow, and a heat medium is passed through the hollow portion, thereby using the surface of the screw as a heat transferring unit. A solid matter may precipitate as condensation progresses. In such a case, a function of renewing a surface by giving shear to the solid matter in order to devolatilize the solvent component contained inside the solid matter is required.

When the ratio $(I_1)/(I_0)$ of a motor current value $(I_1)$ in devolatilizing a solvent by heating the conjugated diene polymer solution while conveying the conjugated diene polymer solution with rotary twin screws in the devolatilization step and rotation power at the time when the screw is rotated in a state where the inside of the apparatus having twin screws is vacant, namely a motor current value $(I_0)$ under no load satisfies the following relational expression (1), the solvent can be devolatilized until the amount of a volatilization residue becomes appropriate while suppressing generation of gel.

$$1.05 \leq ((I_1)/(I_0)) \leq 2.00 \quad (1)$$

By specifying the $(I_1)/(I_0)$ as 1.05 or more, the surface of the conjugated diene polymer is appropriately renewed and the devolatilization of the solvent can be facilitated. On the other hand, by specifying the $(I_1)/(I_0)$ as 2.0 or less, generation of gel can be suppressed. Furthermore, it is preferable that the $(I_1)/(I_0)$ is 1.10 or more and 1.80 or less, and more preferably 1.20 or more and 1.40 or less from the viewpoint of the balance between the performance of devolatilizing a solvent and the thermal degradation.

It is to be noted that the $(I_1)$ is not necessarily a constant value as long as the relational expression (1) is satisfied, and may be a variable value. There is a tendency that the $(I_1)/(I_0)$ is larger as the filling rate of a mixture of the conjugated diene polymer and the solvent in the apparatus or the number of rotations of the screw is higher. Moreover, the $(I_1)/(I_0)$ can also be adjusted by the shape of the screw, the screw diameter, the screw length, the space between the body and the screw, the rate of supplying the mixture of the conjugated diene polymer and the solvent, etc. In the case where a plurality of screws is rotated, the directions of rotation may be the same directions or opposite directions, and the rotational speeds may be the same or different, but it is preferable that the directions of rotation are opposite directions and the rotational speeds are different from the viewpoint of preventing adherence of the polymer to the screws.

In the devolatilization step using an apparatus having twin screws, it is preferable that the average residence time is 5.0 seconds or longer and 300 seconds or shorter, more preferably 10 seconds or longer and 250 seconds or shorter, and still more preferably 20 seconds or longer and 200 seconds or shorter from the viewpoint of the balance between the performance of devolatilizing a solvent and the thermal degradation.

It is preferable that the devolatilization step is a step of devolatilizing a solvent until the content of the solvent reaches 5.0% by mass or less based on the total amount (100% by mass) of the conjugated diene polymer obtained, more preferably the volatilization step is a step of devolatilizing a solvent until the content of the solvent reaches 0.5% by mass or less.

Moreover, it is preferable that, in the devolatilization step, the inner volume of the apparatus having twin screws and the amount of the solvent volatilizing per unit time satisfy the following relational expression (2).

$$1.0 \leq ((V_A)/(V_0)) \leq 50 \quad (2)$$

In the expression (2), $(V_0)$ represents the inner volume [L] of the apparatus and $(V_A)$ represents the amount [L] of the solvent volatilizing per unit time [h]

In the apparatus having screws, the ratio (hereinafter, denoted as "L/D") of the screw length (L) to the screw diameter (D) is 4.0 or more and 12 or less, and more preferably 5.0 or more and 10 or less from the viewpoint of preventing a vent pipe from clogging. When the L/D is 4.0 or more, there is a tendency that the ability of devolatilization is high, and when the L/D is 12 or less, there is a tendency that the amount of gel generated is small. It is to be noted that the twin screws each independently have the ratio within the above-described range; however, it is preferable that the screw diameters are the same and the screw lengths are the same.

The directions of rotation of the rotary twin screws may be the same directions or opposite directions to each other, and the rotational speeds thereof may be the same or different; however, it is more preferable that the directions of rotation are opposite directions and the rotational speeds are different from the viewpoint of preventing adherence of the polymer to the screws.

In the case where two or more of the apparatuses each having screws, each of the apparatuses may have an L/D of 4.0 or more and 12 or less independently. It is to be noted that an apparatus the L/D of which does not fall within such a range, namely an apparatus that is other than the apparatus having screws according to the present embodiments may be used together with the apparatus having screws according to the present embodiments.

In the devolatilization step, when the ratio $(((V_A)/(V_0))$, hereinafter, also simply denoted as "$(V_A)/(V_0)$") of the inner volume $(V_0)$ [L] (hereinafter, also simply denoted as "$V_0$") of the apparatus having screws to the amount $(V_A)$ [L] (hereinafter, also simply denoted as "$V_A$") of the solvent volatilizing per unit time [h] satisfies the following relational expression (2), there is a tendency that the solvent can be devolatilized until the amount of the volatilization residue becomes appropriate while preventing a vent pipe from clogging due to the vent-up of the copolymer solution.

$$1.0 \leq ((V_A)/(V_0)) \leq 50 \quad (2)$$

When the $(V_A)/(V_0)$ is 1.0 or more, there is a tendency that the thermal degradation and gelation of the conjugated diene polymer can be suppressed. Moreover, when the $(V_A)/(V_0)$ is 50 or less, there is a tendency that the vent-up of the conjugated diene polymer solution can be suppressed. Furthermore, it is more preferable that the $(V_A)/(V_0)$ is 5.0 or more and 45 or less, and still more preferably 10 or more and 30 or less from the viewpoint of the balance between the performance of devolatilization and the thermal degradation. The $V_A$ is not necessarily a constant value as long as the relational expression (2) is satisfied, and may be a variable value. It is to be noted that the vent-up is a phenomenon that the conjugated diene polymer or the conjugated diene polymer solution flows into a vent pipe section passing through a vent opening section, and when the conjugated diene polymer solution that is adhered to the surface of the inner wall of the pipe is dried, the conjugated diene polymer in a solid form is left at the surface. When the vent-up continuously occurs, the polymer is piled up at the inner wall of the vent pipe, and it is not long before the vent pipe is clogged. When the vent pipe is clogged, discharge of a solvent gas evaporated from the conjugated diene polymer solution in the apparatus is inhibited to make the devolatilization insufficient, and therefore the amount of the volatilization residue in the conjugated diene polymer may increase.

The $V_0$ represents the volume obtained by subtracting the volume of the screws from the volume of the body of the apparatus. The volume of the body of the apparatus does not include the volume of a jacket for heating/cooling the body and the volume of pipes connected to the apparatus. The pipes connected to the apparatus mean all the pipes connected to the apparatus, and specific examples thereof include a pipe for supplying the conjugated diene copolymer solution, a pipe for feeding the condensate and copolymer of the solution after devolatilization outside the apparatus, and a pipe for feeding the devolatilized solvent gas outside the apparatus. By expanding or reducing the volume of the whole or part of the body, the $V_0$ can be adjusted. Moreover, in the case where the $V_A$ value is large, the $(V_A)/(V_0)$ can be adjusted in an appropriate range in such a way that a space for retaining the solvent gas is provided in a part of the body of the apparatus to increase the $V_A$ value.

It is preferable that the $V_0$ is 1.0 or more, more preferably 5.0 or more, and still more preferably 10 or more from the viewpoint of the performance of devolatilization. Moreover, it is preferable that the $V_0$ is 500 or less, more preferably 400 or less, and still more preferably 300 or less from the viewpoint of the amount of the leaking-in air in the devolatilization condition under reduced pressure where the pressure of the inside of the apparatus is reduced.

The $V_A$ represents the volume of the solvent collected by cooling and liquefying the solvent gas discharged from a vent-port of the apparatus through the vent pipe. A cooler such as a condenser can be used for cooling and liquefying the solvent gas. There is a tendency that the $V_A$ becomes large as the solvent composition contained in the conjugated diene polymer solution supplied to an apparatus having screws becomes large and the amount of the solvent composition supplied becomes large. Moreover, there is a tendency that the $V_A$ also becomes large as the temperature to which warming is conducted with an apparatus having screws becomes high and the pressure in the apparatus becomes low.

In the case where two or more of the apparatuses having screws are used, the $V_A$, $V_0$, and $V_A/V_0$ are independently calculated for each of the apparatuses, and each $V_A/V_0$ may be within the range mentioned above. Moreover, with respect to the unit time in the $V_A$, in the case where two or more of the apparatuses are used, and the apparatuses are connected in series, the total time required for operating all the apparatuses is used as the base for the unit time in the $V_A$ of each apparatus, and in the case where the treatment is conducted in a batch-wise, the time spent for the treatment in each apparatus is used as the base for the unit time in the $V_A$ of each apparatus. It is to be noted that an apparatus the $V_A/V_0$ of which does not fall within such a range, namely an apparatus that is other than the apparatus having screws according to the present embodiments may be used together with the apparatus having screws according to the present embodiments.

It is preferable that the apparatus having twin screws has at least one vent-port for discharging the devolatilized solvent gas component outside the apparatus. The devolatilized gas is cooled with a cooler, etc. after being discharged from the vent-port, condensed, and collected as liquid, and may be reused. When the powder of the polymer is adhered to the vent-port, there may be a possibility that the amount of discharge is lowered, and therefore an apparatus for removing the powder to be adhered may be provided at the vent-port. Specific examples of the apparatus for removing the powder include a scraper or rotary blade that rotates along the inner wall face of the vent-port. A mixture of a polymer and a solvent can be heated by allowing a heat medium such as high-temperature steam or oil to flow through a jacket of the apparatus having twin screws. It is preferable that the temperature of the heat medium at this time is 50° C. or higher and 300° C. or lower from the viewpoint of the devolatilization speed, and more preferably 100° C. or higher and 200° C. or lower from the viewpoint of the conveyability of the mixture and the suppression of gel generation. The temperature of the polymer to be devolatilized is within the ranges; however, the temperature may be lower than these ranges because of the consumption of the heat of vaporization associated with the devolatilization of the solvent.

It is preferable that the pressure in the gas phase section at the time when the solvent is devolatilized is equal to or lower than the normal pressure from the viewpoint of the devolatilization speed, and preferably 50 torr or higher and 650 torr or lower from the viewpoint of the devolatilization speed and the prevention of entrainment caused by the solvent gas of the polymer. In order to control the pressure, for example, a vacuum pump can be connected to the vent-port through a pipe.

A stripping agent may further be added for the purpose of facilitating the devolatilization of the solvent. Examples of the stripping agent include water, alcohols, and a supercritical carbonic acid gas.

It is preferable to heat the conjugated diene polymer solution before supplying the conjugated diene polymer solution to the apparatus having screws because there is a tendency that the devolatilization speed is increased. The heating temperature is not particularly limited; however, when the solution is heated to a temperature equal to or higher than the boiling point of the solvent at a pressure in the apparatus, there is a tendency that the devolatilization speed becomes high, and therefore it is preferable to heat the solution to a temperature higher than the boiling point of the solvent by 50° C. or higher, and is more preferable to heat the solution to a temperature higher than the boiling point of the solvent by 80° C. or higher. It is preferable to heat the solution at 120° C. or lower, and more preferably 100° C. or lower from the viewpoint of the prevention of entrainment of the conjugated diene polymer in the apparatus during the devolatilization. As a specific example, in the case where the solvent in the conjugated diene polymer solution is hexane, and the pressure in the apparatus having twin screws is 400 torr, the conjugated diene polymer solution may be heated to 50° C. or higher because the boiling point of hexane at 400 torr is about 50° C.

The conjugated diene polymer solution can also be condensed with an apparatus not having twin screws before supplying the conjugated diene polymer solution to the apparatus having twin screws. Examples of the apparatus not having twin screws include a flash tank, a thin film type condenser, a drum dryer, and a container for condensation with a stirring blade.

The shape of a discharge port for discharging the conjugated diene polymer after devolatilization outside the apparatus from the apparatus having twin screws is not particularly limited, and the amount of discharge can be controlled, and the motor current value can be controlled by adjusting the area of the discharge port or the position of the discharge port. Moreover, it is preferable to store the conjugated diene polymer after devolatilization under an environment such as an atmosphere of water or an inert gas, or under reduced pressure in order to prevent the degradation due to heat or oxygen in the air.

It is preferable that the amount of the volatilization residue in the devolatilized conjugated diene polymer is 0.001% by mass or more and 5.0% by mass or less based on the total amount (100% by mass) of the conjugated diene polymer from the viewpoint of the workability during processing the conjugated diene polymer to a product. The volatilization residue may contain water in addition to a raw material such as a solvent used in polymerization. The amount of the volatilization residue is measured by the method described in Examples mentioned later.

It is preferable that the gel content in the conjugated diene polymer is 5.0% by mass or less based on the total amount (100% by mass) of the conjugated diene polymer from the viewpoint of the product performance and the appearance. The gel content is measured by the method described in Examples mentioned later.

The conjugated diene polymer can be compression-molded into a rectangular parallelepiped called a bale in the art. Moreover, the conjugated diene polymer can be blended with another rubber material such as natural rubber, an inorganic material such as silica or carbon, or other materials and processed into tires, various kinds of industrial belts, shoes, etc.

EXAMPLES

Hereinafter, the present embodiments will be described more specifically giving Examples and Comparative Examples; however, the present embodiments are not limited by Examples below as long as the present embodiments are within a scope of the gist of the present invention. Evaluation methods of various properties in Examples and Comparative Examples are as follows.

(Physical Property 1) Amount of Bonded Styrene

A sample was prepared as a chloroform solution, and the amount (% by mass) of bonded styrene based on 100% by mass of the conjugated diene copolymer was measured (manufactured by Shimadzu Corporation: UV-2450) by absorption at UV254 nm of a phenyl group in styrene.

(Physical Property 2) Microstructure of Butadiene Moiety

An infrared spectrum was measured using an infrared spectrophotometer (manufactured by JASCO Corporation: FT-IR230) in a range of 600 to 1000 $cm^{-1}$. A sample was prepared as a carbon disulfide solution, and a solution cell was used. The microstructure of a butadiene moiety, namely the amount of the vinyl bond (mol %) was determined from absorbance obtained as a result according to a calculation expression of a Hampton method (method described in R. R. Hampton, Analytical Chemistry 21, 923(1949)).

(Physical Property 3) Weight Average Molecular Weight and Molecular Weight Distribution Chromatograms of a sample and of standard polystyrenes were measured by GPC with 3 connected columns using polystyrene-based gel as a filler (guard column; Tosoh TSKguardcolumn HHR-H, column; Tosoh TSKgel G6000HHR, TSKgel G5000HHR, TSKgel G4000HHR). A calibration curve was prepared from the measurement results of standard polystyrenes, and the weight average molecular weight (Mw) and the molecular weight distribution (Mw/Mn) were calculated according to the calibration curve. Tetrahydrofuran (THF) was used as an eluent. In 20 mL of THF, 10 mg of the sample was dissolved, and 200 µL of the resultant solution were injected to the column and the measurement was conducted. The measurement was conducted using Tosoh; HLC8020 (detector; RI) under the condition that the temperature in an oven was 40° C., and the flow rate of THF was 1.0 mL/minute. The ratio (S0)/(S1) of the total integrated value (S0) to the integrated value (S1) for a component having a molecular weight of 1000000 or higher in the molecular weight distribution curve of the conjugated diene polymer, obtained by the measurement described above, was determined as the composition of the molecular weight of 1000000 or higher in the conjugated diene polymer.

(Physical Property 4) Mooney Viscosity

Viscosity was measured at 4 minutes after preheating at 100° C. for 1 minute according to JIS K6300-1:2001.

(Evaluation 1) Amount of Volatilization Residue in Conjugated Diene Polymer

Under a condition of 180° C. at 50 torr, 1 g of the conjugated diene polymer obtained in the devolatilization step was left to stand for 3 hours. The amount (δ [g]) of the mass of the conjugated diene polymer reduced by the operation was defined as the amount of the volatilization residue, and the amount (% by mass) of the volatilization residue was determined from a calculation expression of 100×δ/(1−δ).

(Evaluation 2) Gel Content

In 100 g of toluene, 3 g of the conjugated diene polymer obtained in the devolatilization step were completely dissolved, and the resultant solution was filtered with 100-mesh filter paper (α1 [g]). The filter paper after filtration was dried and weighed (α2 [g]), and the gel content (% by mass) was determined from a calculation expression of 100× (α2−α1)/3. It is to be noted that the limit value of quantitative determination and the limit value of detection in this measurement are 0.1% by mass, and in the case where the measured value is lower than 0.1% by mass, the measured value is described as "not detected".

(Evaluation 3) Amount of Polymer Adhered Inside Vent Pipe

The inside of the vent pipe was observed with the naked eyes after devolatilization operation, and in the case where the conjugated diene polymer adhered was able to be confirmed, the conjugated diene polymer was collected and weighed to be evaluated. It is to be noted that, in the case where the adhered polymer cannot be confirmed, the amount of the polymer is described as "0 g".

(Condition 1) Inner Volume ($V_0$) of Devolatilization Apparatus

The inner volume ($V_0$) in Examples and Comparative Examples represents the inner volume (L) of the devolatilization apparatus and does not include the volume of the screw section and jacket section of the apparatus. Specifically, water was put in the apparatus in a state where all of the joint sections between the apparatus and the pipes connected to the apparatus, such as a vent pipe, a feed pipe, raw material-feeding pipe, a pipe for ejecting a polymer, until the apparatus was filled with water, and the amount of water at the time when the apparatus was filled with water was determined as $V_0$.

(Production Example 1) Conjugated Diene Polymer Solution (A)

Two 10-L reactors (L/D=4.0 as ratio of the reactor length (L) to the reactor diameter (D)) each provided with a stirring blade having four paddles were disposed in series, the first one was used as a polymerization reactor, and the second one was used as a modification reactor. 1,3-Butadiene, styrene, and n-hexane, in which impurities such as moisture were removed in advance, were mixed under conditions of 22.0 g/min, 7.1 g/min, and 144 g/min, respectively. Further, the resultant mixture was mixed immediately before the first reactor with n-butyllithium (n-butyllithium for treatment) for impurity-deactivating treatment at a rate of 0.084 mmol/min using a static mixer, and the resultant mixture was then continuously supplied to the bottom portion of the first reactor. Furthermore, 2,2-bis(2-oxolanyl)propane as a polar substance and n-butyllithium as a polymerization initiator were supplied to the bottom portion of the first reactor at rates of 0.040 g/min and 0.350 mmol/min, respectively, to continue the polymerization reaction such that the inner temperature at the outlet of the reactor was 90° C. The polymerization solution extruded from the first reactor was supplied as it was to the second reactor. The temperature of the second reactor was kept at 85° C., and 2,2-dimethoxy-1-(3-trimethoxysilylpropyl)-1-aza-2-silacyclopentane was added as a modifying agent at a rate of 0.046 mmol/min from the bottom portion of the second reactor to conduct modification reaction. The reaction liquid was made to flow out so that the liquid level height of the second reactor might be 70% of the whole height of the reactor, and an antioxidant (BHT) and S-RAE oil (NC-140, manufactured by JX Nippon Oil & Energy Corporation) were continuously added at rates of 0.048 g/min (n-hexane solution) and 1.75 g/min, respectively, to the liquid flown out to obtain a conjugated diene polymer solution (A).

The obtained conjugated diene polymer solution (A) contained 84 parts by mass of normal hexane, 16 parts by mass of the conjugated diene polymer, and 6.0 parts by mass of the process oil. As a result of analyzing the conjugated diene polymer in the conjugated diene polymer solution (A) obtained, the amount of bonded styrene was 27% by mass, the amount of bonded butadiene was 73% by mass, the amount of the vinyl bond in butadiene was 65 mol %, and it was found from the molecular weight in terms of polystyrene that the weight average molecular weight (Mw) was 1100000, the molecular weight distribution (Mw/Mn) was 2.2, and the composition of the molecular weight of 1000000 or higher was 45% by mass. Moreover, the Mooney viscosity of the conjugated diene polymer was 55.

(Production Example 2) Conjugated Diene Polymer Solution (B)

The amount of the solvent and the structure of the conjugated diene polymer in a conjugated diene polymer solution (B) were the same as in the conjugated diene polymer solution (A) except that the content of the process oil was set to 3.0 parts by mass. The Mooney viscosity was 70.

(Production Example 3) Conjugated Diene Polymer Solution (C)

The amount of the solvent and the structure of the conjugated diene polymer in a conjugated diene polymer solution (C) were the same as in the conjugated diene polymer solution (A) except that the process oil was not contained at all. The Mooney viscosity was 90.

The results obtained above are shown together in Table 1.

TABLE 1

| Conjugated diene polymer solution | | (A) | (B) | (C) |
|---|---|---|---|---|
| Conjugated diene polymer | Conjugated diene polymer [parts by mass] | 16 | 16 | 16 |
| | (Physical property 1) amount of bonded styrene [% by mass] | 27 | 27 | 27 |
| | (Physical property 1) bonded butadiene [% by mass] | 73 | 73 | 73 |
| | (Physical property 2) amount of vinyl bond [mol %] | 65 | 65 | 65 |
| | (Physical property 3) weight average molecular weight (Mw) | $110 \times 10^4$ | $110 \times 10^4$ | $110 \times 10^4$ |
| | (Physical property 3) molecular weight distribution (Mw/Mn) | 2.2 | 2.2 | 2.2 |
| | (Physical property 4) Mooney viscosity | 55 | 70 | 90 |
| | Solvent [parts by mass] | 84 | 84 | 84 |
| | Process oil [parts by mass] | 6.0 | 3.0 | 0.0 |

Example 1

In a twin-screw type kneader with a screw diameter (D) of 50 mm, a ratio (L/D) of the screw length (L) to the screw diameter (D) of 6.0, and $V_0$=4.0, the conjugated diene polymer solution (A) was continuously supplied from a supply port at a rate of 50 Kg per hour. At that time, the rotational speeds of screws and the directions of rotation observed from a motor driving section were 100 rpm and anticlockwise for both of the twin screws. With respect to the motor current value, the $I_0$ was 8.1 A before supplying the sample, the $I_1$ was 9.4 A after supplying the sample, and the $I_1/I_0$ was 1.16. The current was an alternating current with a frequency of 60 Hz. The conjugated diene polymer solution (A) was heated while the heat medium oil at 200° C. was supplied to a jacket of the kneader. The vent-port was connected to a vacuum pump through a pipe, and the pressure inside the apparatus was kept at 100 torr. The conjugated diene polymer solution (A) was being condensed while being conveyed with screws, and finally discharged from a 70-mm square port provided at the lower face of the tip of the kneader apparatus, and thus a conjugated diene polymer (P1) in a solid form was obtained. The devolatilized solvent gas passed through the vent-port and was condensed with a condenser installed before the vacuum pump and cooled to 7° C. to be collected as liquid. The supply of the conjugated diene polymer solution (A) was stopped at a point in time when the above-described operation was continued for 1 hour, and the inner wall of the vent pipe was observed; however, adhesion of the polymer was not observed. The amount ($V_A$) of the solvent collected was 57 L, and the ($V_A$)/($V_0$) was 14. The amount of the volatilization residue in the P1 was 0.65% by mass, and gel was not detected.

Example 2

In a twin-screw type kneader with a screw diameter of 50 mm, L/D=6.0, and $V_0$=6.0, the conjugated diene polymer solution (A) was continuously supplied from a supply port at a rate of 50 Kg per hour. At that time, the rotational speeds of screws and the directions of rotation observed from a motor driving section were 50 rpm and anticlockwise for one of the screws, and 100 rpm and clockwise for the other. With respect to the motor current value, the $I_0$ was 9.0 A before supplying the sample, the $I_1$ was 10.0 A after supplying the sample, and the $I_1/I_0$ was 1.11. The current was an alternating current with a frequency of 60 Hz. The conjugated diene polymer solution (A) was heated while the heat medium oil at 180° C. was supplied to a jacket of the kneader. The vent-port was connected to a vacuum pump through a pipe, and the pressure inside the apparatus was kept at 100 torr. The conjugated diene polymer solution (A) was being condensed while being conveyed with screws, and finally discharged from a small-sized extruder connected to the upper face of the tip of the kneader apparatus, and thus a conjugated diene polymer (P2) in a solid form was obtained. The vaporized solvent passed through the vent-port and was condensed with a condenser installed before the vacuum pump and cooled to 7° C. to be collected as liquid. The supply of the conjugated diene polymer solution (A) was stopped at a point in time when the above-described operation was continued for 1 hour, and the inner wall of the vent pipe was observed; however, adhesion of the polymer was not observed. The amount ($V_A$) of the solvent collected was 58 L, and the ($V_A$)/($V_0$) was 10. The solvent in the devolatilized conjugated diene polymer (P2) in a solid form was devolatilized by the above-described operation, and the amount of the volatilization residue in the P2 was 0.27% by mass, and gel was not detected.

Example 3

A biaxial extruder with a screw diameter of 30 mm, L/D=20, and $V_0$=2.0, the extruder used for kneading a resin, was used as a devolatilization apparatus. The conjugated diene polymer solution (A) was continuously supplied from a supply port at a rate of 30 Kg per hour. The directions of rotation were the same for the screws, and the number of rotations was 100 rpm. With respect to the motor current value, the $I_0$ was 8.0 A before supplying the sample, the $I_1$ was 10.0 A after supplying the sample, and the $I_1/I_0$ was 1.25. The current was an alternating current with a frequency of 60 Hz. The body of the biaxial extruder was heated to 180° C. with a heater. The vent-port provided at the body was connected to a vacuum pump through a pipe, and the pressure inside the apparatus was kept at 100 torr. The conjugated diene polymer solution (A) was being condensed while being conveyed with screws, and a conjugated diene polymer (P3) in a solid form was finally extruded from a tip die of the kneader apparatus. The vaporized solvent passed through the vent-port and was condensed with a condenser installed before the vacuum pump and cooled to 7° C. to be collected as liquid. The supply of the conjugated diene polymer solution (A) was stopped at a point in time when the above-described operation was continued for 1 hour, and the inner wall of the vent pipe was observed. As a result, an adhered copolymer was observed. The adhered polymer was collected and weighed to find that the weight was 14 g. The amount ($V_A$) of the solvent collected was 34 L, and the $(V_A)/(V_O)$ was 17. The amount of the volatilization residue in the P3 was 1.2% by mass, and the gel content was 1.8% by mass.

Example 4

Devolatilization was conducted in the same manner as in Example 2 except that the conjugated diene polymer solution (B) was used as a raw material in place of the conjugated diene polymer solution (B). With respect to the motor current value, the $I_0$ was 9.0 A before supplying the sample, the $I_1$ was 12.7 A after supplying the sample, and the $I_1/I_0$ was 1.41. The current was an alternating current with a frequency of 60 Hz. The supply of the conjugated diene polymer solution (A) was stopped at a point in time when the above-described operation was continued for 1 hour, and the inner wall of the vent pipe was observed; however, adhesion of the polymer was not observed. The amount ($V_A$) of the solvent collected was 60 L, and the $(V_A)/(V_O)$ was 10. The amount of the volatilization residue in a conjugated diene polymer (P4) obtained through devolatilization was 0.7% by mass, and the gel content was 0.8% by mass.

Example 5

Devolatilization was conducted in the same manner as in Example 2 except that the conjugated diene polymer solution (C) was used as a raw material in place of the conjugated diene polymer solution (A). With respect to the motor current value, the $I_0$ was 9.0 A before supplying the sample, the $I_1$ was 14.7 A after supplying the sample, and the $I_1/I_0$ was 1.63. The current was an alternating current with a frequency of 60 Hz. The supply of the conjugated diene polymer solution (A) was stopped at a point in time when the above-described operation was continued for 1 hour, and the inner wall of the vent pipe was observed; however, adhesion of the polymer was not observed. The amount of the solvent collected was 40 L ($V_A$), and the $(V_A)/(V_O)$ was 6.7. The amount of the volatilization residue in a conjugated diene polymer (P5) obtained through devolatilization was 0.6% by mass, and the gel content was 1.0% by mass.

Example 6

Devolatilization was conducted in the same manner as in Example 2 except that the amount of the conjugated diene polymer solution (A) supplied was set to 200 Kg per hour. With respect to the motor current value, the $I_0$ was 9.0 A before supplying the sample, the $I_1$ was 12.7 A after supplying the sample, and the $I_1/I_0$ was 1.41. The current was an alternating current with a frequency of 60 Hz. The supply of the conjugated diene polymer solution (A) was stopped at a point in time when the above-described operation was continued for 1 hour, and the inner wall of the vent pipe was observed; however, adhesion of the polymer was not observed. The amount ($V_A$) of the solvent collected was 60 L, and the $(V_A)/(V_O)$ was 10. The amount of the volatilization residue in a conjugated diene polymer (P6) obtained through devolatilization was 25.3% by mass, and gel was not detected.

Subsequently, devolatilization was conducted in the same manner as in Example 3 except that the conjugated diene polymer (P6) was supplied at 100 Kg per hour. With respect to the motor current value, the $I_0$ was 8.0 A before supplying the sample, the $I_1$ was 11.4 A after supplying the sample, and the $I_1/I_0$ was 1.43. The current was an alternating current with a frequency of 60 Hz. The supply of the conjugated diene polymer solution (A) was stopped at a point in time when the above-described operation was continued for 1 hour, and the inner wall of the vent pipe was observed; however, adhesion of the polymer was not observed. The amount ($V_A$) of the solvent collected was 37 L, and the $(V_A)/(V_O)$ was 19. The amount of the volatilization residue in a conjugated diene polymer (P7) obtained through devolatilization was 0.54% by mass, and gel was not detected.

Example 7

The biaxial extruder used in Example 3 was directly connected to the apparatus used in Example 2 and including a twin-screw type kneader and a small-sized extruder. The $V_0$ was 8.0. The structure was such that the ejection side of the small-sized extruder was directly connected to the side face of the biaxial extruder. The conjugated diene polymer solution (A) was supplied to the twin-screw type kneader at 200 Kg per hour, and the devolatilization treatment was conducted under the same operating condition as in Example 2. The polymer mixture condensed with the twin-screw type kneader was transferred from the twin-screw type kneader to the biaxial extruder through the small-sized extruder. The operating condition of the biaxial extruder was the same as in Example 3. As a result of measuring the motor current value, the $I_1$ was 12.8 A and the $I_1/I_0$ was 1.42 for the twin-screw type kneader, and the $I_1$ was 13.4 A and the $I_1/I_0$ was 1.68 for the biaxial extruder. The supply of the conjugated diene polymer solution (A) was stopped at a point in time when the above-described operation was continued for 1 hour, and the inner wall of the vent pipe was observed; however, adhesion of the polymer was not observed. The amount ($V_A$) of the solvent collected was 57 L, and the $(V_A)/(V_O)$ was 7.1. A conjugated diene polymer (P8) in a powder form was discharged from the tip of the biaxial extruder. The amount of the volatilization residue in the P8 was 0.2% by mass, and the gel content was 0.1% by mass.

Comparative Example 1

Devolatilization was conducted in the same manner as in Example 1 except that the rate of supplying the conjugated diene polymer solution (A) was set to 100 Kg per hour, and the shape of the discharge port at the tip section of the apparatus for discharging the polymer was made 50-mm square. With respect to the motor current value, the $I_0$ was 8.1 A before supplying the sample, the I' was 18.6 A after supplying the sample, and the $I_1/I_0$ was 2.30. The supply of the conjugated diene polymer solution (A) was stopped at a point in time when the above-described operation was continued for 1 hour, and the inner wall of the vent pipe was observed; however, adhesion of polymer was not observed. The amount ($V_A$) of the solvent collected was 114 L, and the ($V_A$)/($V_0$) was 29. The amount of the volatilization residue in a conjugated diene polymer (P9) obtained through devolatilization was 0.53% by mass, and the gel content was 6.4% by mass.

Comparative Example 2

Devolatilization was conducted in the same manner as in Example 1 except that the conjugated diene polymer solution (A) was diluted with normal hexane so as to contain 98 parts by mass of normal hexane, 2 parts by mass of the conjugated diene polymer, and 0.7 parts by mass of the process oil was supplied. The $I_0$ was 8.1 A, the $I_1$ was 8.3 A after supplying the sample, and the $I_1/I_0$ was 1.02. The supply of the conjugated diene polymer solution was stopped at a point in time when the above-described operation was continued for 1 hour, and the inner wall of the vent pipe was observed; however, adhesion of the polymer was not observed. The amount ($V_A$) of the solvent collected was 73 L, and the ($V_A$)/($V_0$) was 18. Liquid matter was discharged from the lower face of the tip of the kneader apparatus, the composition thereof contained 90 parts by mass of normal hexane and 10 parts by mass of the conjugated diene polymer, the efficiency of condensation was low, and a devolatilized conjugated diene polymer was not obtained.

The results obtained above are shown together in Table 2.

TABLE 2

|  | Example 1 | Example 2 | Example 3 | Example 4 | Example 5 |
|---|---|---|---|---|---|
| Conjugated diene polymer solution | (A) | (A) | (A) | (B) | (C) |
| Apparatus having twin screws | Twin-screw type kneader | Twin-screw type kneader | Biaxial extruder | Twin-screw type kneader | Twin-screw type kneader |
| Screw diameter [mm] | 50 | 50 | 30 | 50 | 50 |
| L/D | 6.0 | 6.0 | 20 | 6.0 | 6.0 |
| Amount of supply [Kg/Hour] | 50 | 50 | 30 | 50 | 50 |
| Rotational speed of screw 1 [rpm] | 100 | 50 | 100 | 50 | 50 |
| Direction of rotation 1 | Anticlockwise | Anticlockwise | — | Anticlockwise | Anticlockwise |
| Rotational speed of screw 2 [rpm] | 100 | 100 | 100 | 100 | 100 |
| Direction of rotation 2 | Anticlockwise | Clockwise | — | Clockwise | Clockwise |
| $I_0$ [A] | 8.1 | 9.0 | 8.0 | 9.0 | 9.0 |
| $I_1$ [A] | 9.4 | 10.0 | 10.0 | 12.7 | 14.7 |
| $I_1/I_0$ | 1.16 | 1.11 | 1.25 | 1.41 | 1.63 |
| Frequency of current [Hz] | 60 | 60 | 60 | 60 | 60 |
| $V_A$ [L] | 57 | 58 | 34 | 60 | 40 |
| $V_0$ [L] | 4.0 | 6.0 | 2.0 | 6.0 | 6.0 |
| $V_A/V_0$ | 14 | 10 | 17 | 10 | 6.7 |
| Temperature of heat medium oil [° C.] | 200 | 180 | 180 | 180 | 180 |
| Pressure inside apparatus [Torr] | 100 | 100 | 100 | 100 | 100 |
| Position of discharge port | Lower face of tip | Upper face of tip | Tip die | Upper face of tip | Upper face of tip |
| Discharge port | 70-mm Square port | Small-sized extruder | — | Small-sized extruder | Small-sized extruder |
| Conjugated diene polymer | P1 | P2 | P3 | P4 | P5 |
| (Evaluation 1) amount of volatilization residue [% by mass] | 0.65 | 0.27 | 1.2 | 0.7 | 0.6 |
| (Evaluation 2) gel content [% by mass] | Not detected | Not detected | 1.8 | 0.8 | 1.0 |
| (Evaluation 3) amount of polymer adhered to vent pipe [g] | 0 | 0 | 14 | 0 | 0 |

|  | Example 6 | Example 7 |  | Comparative Example 1 | Comparative Example 2 |
|---|---|---|---|---|---|
| Conjugated diene polymer solution | (A) | (P6) | (A) | (A) | Diluted (A) |
| Apparatus having twin screws | Twin-screw type kneader | Biaxial extruder | Twin-screw type kneader | Biaxial extruder | Twin-screw type kneader | Twin-screw type kneader |
| Screw diameter [mm] | 50 | 30 | 50 | 30 | 50 | 50 |
| L/D | 6.0 | 20 | 6.0 | 20 | 6.0 | 6.0 |
| Amount of supply [Kg/Hour] | 200 | 100 | 200 | — | 100 | 50 |
| Rotational speed of screw 1 [rpm] | 50 | 100 | 50 | 100 | 100 | 100 |
| Direction of rotation 1 | Anticlockwise | — | Anticlockwise | — | Anticlockwise | Anticlockwise |
| Rotational speed of screw 2 [rpm] | 100 | 100 | 100 | 100 | 100 | 100 |
| Direction of rotation 2 | Clockwise | — | Clockwise | — | Anticlockwise | Anticlockwise |
| $I_0$ [A] | 9.0 | 8.0 | 9.0 | 8.0 | 8.1 | 8.1 |
| $I_1$ [A] | 12.7 | 11.4 | 12.8 | 13.4 | 18.6 | 8.3 |
| $I_1/I_0$ | 1.41 | 1.43 | 1.42 | 1.68 | 2.30 | 1.02 |
| Frequency of current [Hz] | 60 | 60 | 60 | 60 | 60 | 60 |
| $V_A$ [L] | 60 | 37 | 57 |  | 114 | 73 |
| $V_0$ [L] | 6.0 | 2.0 | 8.0 |  | 4.0 | 4.0 |
| $V_A/V_0$ | 10 | 19 | 7.1 |  | 29 | 18 |

TABLE 2-continued

| | | | | | | |
|---|---|---|---|---|---|---|
| Temperature of heat medium oil [° C.] | 180 | 180 | 180 | 180 | 200 | 200 |
| Pressure inside apparatus [Torr] | 100 | 100 | 100 | 100 | 100 | 100 |
| Position of discharge port | Upper face of tip | Tip die | — | Tip die | Lower face of tip | Lower face of tip |
| Discharge port | Small-sized extruder | — | — | — | 50-mm Square port | 70-mm Square port |
| Conjugated diene polymer | P6 | P7 | P8 | | P9 | Not obtained |
| (Evaluation 1) amount of volatilization residue [% by mass] | 25.3 | 0.54 | 0.2 | | 0.53 | — |
| (Evaluation 2) gel content [% by mass] | Not detected | Not detected | 0.1 | | 6.4 | — |
| (Evaluation 3) amount of polymer adhered to vent pipe [g] | 0 | 0 | 0 | | 0 | 0 |

(Production Example 4) Conjugated Diene Polymer Solution (D)

Two 10-L reactors (L/D=4.0) each provided with a stirring blade having four paddles were disposed in series, the first one was used as a polymerization reactor, and the second one was used as a modification reactor. 1,3-Butadiene, styrene, and n-hexane, in which impurities such as moisture were removed in advance, were mixed under conditions of 22.0 g/min, 7.1 g/min, and 144 g/min, respectively. Further, the resultant mixture was mixed immediately before the polymerization reactor with n-butyllithium (n-butyllithium for treatment) for impurity-deactivating treatment at a rate of 0.10 mmol/min using a static mixer, and the resultant mixture was then continuously supplied to the bottom portion of the polymerization reactor. Furthermore, 2,2-bis(2-oxolanyl)propane as a polar substance and n-butyllithium as a polymerization initiator were supplied to the bottom portion of the polymerization reactor at rates of 0.040 g/min and 0.210 mmol/min, respectively, to continue the polymerization reaction such that the inner temperature at the outlet of the reactor was 90° C. The polymerization solution extruded from the first reactor was supplied as it was to the modification reactor. The temperature of the modification reactor was kept at 85° C., and tetraglycidyl-1,3-bisaminomethylcyclohexane was added as a modifying agent at a rate of 0.42 mmol/min from the bottom portion of the modification reactor to conduct modification reaction. The reaction liquid was made to flow out so that the liquid level height in the reactor might be 70% of the whole height of the reactor, and an antioxidant (2,6-di-tert-butyl-4-hydroxytoluene (BHT)) and S-RAE oil (NC-140, manufactured by JX Nippon Oil & Energy Corporation) as process oil were continuously added at rates of 0.048 g/min (n-hexane solution) and 5.80 g/min, respectively, to the liquid flown out to obtain a conjugated diene polymer solution (D).

The obtained conjugated diene polymer solution (D) contained 83 parts by mass of normal hexane, 17 parts by mass of the conjugated diene polymer, and 3.4 parts by mass of the process oil. As a result of analyzing, as a sample, a conjugated diene polymer (P10) obtained from the obtained conjugated diene polymer solution (D) through the operation in Example 8 mentioned later, the amount of bonded styrene was 24% by mass, the amount of bonded butadiene was 76% by mass, the amount of the vinyl bond in butadiene was 65 mol %, and it was found from the molecular weight in terms of polystyrene that the weight average molecular weight (Mw) was 800000, the molecular weight distribution (Mw/Mn) was 1.9, and the composition of the molecular weight of 1000000 or higher was 15% by mass. Moreover, the Mooney viscosity of the conjugated diene polymer was 65.

(Production Example 5) Conjugated Diene Polymer Solution (E)

The amount of the solvent and the structure of the conjugated diene polymer in a conjugated diene polymer solution (E) was the same as in the conjugated diene polymer solution (D) except that the content of the process oil was set to 2.6 parts by mass. The Mooney viscosity, when measured using, as a sample, a conjugated diene polymer (P13) obtained from the obtained conjugated diene polymer solution (E) through the operation in Example 11 mentioned later, was 75. Other compositions and physical properties are shown in Table 3.

(Production Example 6) Conjugated Diene Polymer Solution (F)

The amount of the solvent and the structure of the conjugated diene polymer in a conjugated diene polymer solution (F) were the same as in the conjugated diene polymer solution (D) except that the process oil was not contained at all. The Mooney viscosity, when measured using, as a sample, a conjugated diene polymer (P14) obtained from the obtained conjugated diene polymer solution (F) through the operation in Example 12 mentioned later, was 95. Other compositions and physical properties are shown in Table 3.

(Production Example 7) Conjugated Diene Polymer Solution (G)

A conjugated diene polymer solution (G) was obtained employing the same production process as employed for the conjugated diene polymer solution (D) except that 0.21 mmol of 2,2-dimethoxy-1-(3-trimethoxysilylpropyl)-1-aza-2-silacyclopentane were used as a modifying agent added after polymerization in place of tetraglycidyl-1,3-bisaminomethylcyclohexane. The obtained conjugated diene copolymer solution (G) contained 83 parts by mass of normal hexane, 17 parts by mass of the conjugated diene polymer, and 3.4 parts by mass of the process oil. As a result of analyzing, as a sample, a conjugated diene polymer (P18) obtained from the obtained conjugated diene polymer solution (G) through the operation in Example 15 mentioned later, the amount of bonded styrene was 24% by mass, the amount of bonded butadiene was 76% by mass, the amount of the vinyl bond in butadiene was 64 mol %, and it was found from the molecular weight in terms of polystyrene that the weight average molecular weight (Mw) was 950000, the molecular weight distribution (Mw/Mn) was 2.0, and the composition of the molecular weight of 1000000 or higher was 25% by mass. Moreover, the Mooney viscosity of the conjugated diene polymer was 80. Other compositions and physical properties are shown in Table 3.

The results obtained above are shown together in Table 3.

TABLE 3

| | Conjugated diene polymer solution | (D) | (E) | (F) | (G) |
|---|---|---|---|---|---|
| Conjugated diene polymer | Conjugated diene polymer [parts by mass] | 17 | 17 | 17 | 17 |
| | (Physical property 1) amount of bonded styrene [% by mass] | 24 | 24 | 24 | 24 |
| | (Physical property 1) bonded butadiene [% by mass] | 76 | 76 | 76 | 76 |
| | (Physical property 2) amount of vinyl bond [mol %] | 65 | 65 | 65 | 64 |
| | (Physical property 3) weight average molecular weight (Mw) | $80 \times 10^4$ | $80 \times 10^4$ | $80 \times 10^4$ | $95 \times 10^4$ |
| | (Physical property 3) molecular weight distribution (Mw/Mn) | 1.9 | 1.9 | 1.9 | 2.0 |
| | (Physical property 4) Mooney viscosity | 65 | 75 | 95 | 80 |
| Solvent [parts by mass] | | 83 | 83 | 83 | 83 |
| Process oil [parts by mass] | | 3.4 | 2.6 | 0.0 | 3.4 |

Example 8

In a twin-screw type kneader with a screw diameter (D) of 100 mm, a ratio (L/D) of the screw length (L) to the screw diameter (D) of 6.0, and $V_0=8.0$, the conjugated diene polymer solution (D) was continuously supplied from a supply port at a rate of 60 Kg per hour. At that time, the rotational speeds of screws and the directions of rotation observed from a motor driving section were 100 rpm and anticlockwise for both of the twin screws. With respect to the motor current value, the $I_0$ was 12.0 A before supplying the sample, the $I_1$ was 14.0 A after supplying the sample, and the $I_1/I_0$ was 1.17. The current was an alternating current with a frequency of 60 Hz. The conjugated diene polymer solution (D) was heated while the heat medium oil at 200° C. was supplied to a jacket of the kneader. The vent-port was connected to a vacuum pump through a pipe, and the pressure inside the apparatus was kept at 100 torr. The conjugated diene polymer solution (D) was being condensed while being conveyed with screws, and finally discharged from a 70-mm square port provided at the lower face of the tip of the kneader apparatus, and thus a conjugated diene polymer (P10) in a solid form was obtained. The devolatilized solvent gas passed through the vent-port and was condensed with a condenser installed before the vacuum pump and cooled to −30° C. to be collected as liquid. The supply of the conjugated diene polymer solution (D) was stopped at a point in time when the above-described operation was continued for 1 hour, and the inner wall of the vent pipe was observed; however, adhesion of the polymer was not observed. The amount ($V_A$) of the solvent collected was 72 L, and the ($V_A$)/($V_0$) was 9.0. The amount of the volatilization residue in the P10 was 0.7% by mass, and gel was not detected.

Example 9

In a twin-screw type kneader with a screw diameter of 100 mm, L/D=6.0, and $V_0=8.0$, the conjugated diene polymer solution (D) was continuously supplied from a supply port at a rate of 100 Kg per hour. At that time, the rotational speeds of screws and the directions of rotation observed from a motor driving section were 150 rpm and anticlockwise for one of the screws, and 300 rpm and clockwise for the other. With respect to the motor current value, the $I_0$ was 10.7 A before supplying the sample, the $I_1$ was 15.3 A after supplying the sample, and the $I_1/I_0$ was 1.43. The current was an alternating current with a frequency of 60 Hz. The conjugated diene polymer solution (D) was heated while the heat medium oil at 180° C. was supplied to a jacket of the kneader. The vent-port was connected to a vacuum pump through a pipe, and the pressure inside the apparatus was kept at 100 torr. The conjugated diene polymer solution (D) was being condensed while being conveyed with screws, and finally discharged from a small-sized extruder connected to the upper face of the tip of the kneader apparatus, and thus a conjugated diene polymer (P11) in a solid form was obtained. The vaporized solvent passed through the vent-port and was condensed with a condenser installed before the vacuum pump and cooled to −30° C. to be collected as liquid. The supply of the conjugated diene polymer solution (D) was stopped at a point in time when the above-described operation was continued for 1 hour, and the inner wall of the vent pipe was observed; however, adhesion of the polymer was not observed. The amount ($V_A$) of the solvent collected was 120 L, and the ($V_A$)/($V_0$) was 15. The solvent in the devolatilized conjugated diene polymer (P11) in a solid form was devolatilized by the above-described operation, and the amount of the volatilization residue in the P11 was 0.3% by mass, and gel was not detected.

Example 10

A biaxial extruder with a screw diameter of 50 mm, L/D=8.0, and $V_0=2.0$, the extruder used for kneading a resin, was used as a devolatilization apparatus. The conjugated diene polymer solution (D) was continuously supplied from a supply port at a rate of 3 Kg per hour. The directions of rotation were the same, and the number of rotations was 120 rpm for both of the twin screws. With respect to the motor current value, the $I_0$ was 8.3 A before supplying the sample, the $I_1$ was 9.2 A after supplying the sample, and the $I_1/I_0$ was 1.11. The current was an alternating current with a frequency of 60 Hz. The body of the biaxial extruder was heated to 180° C. with a heater. The vent-port provided at the body was connected to a vacuum pump through a pipe, and the pressure inside the apparatus was kept at 100 torr. The conjugated diene polymer solution (D) was being condensed while being conveyed with screws, and a conjugated diene polymer (P12) in a solid form was finally extruded from a tip die of the kneader apparatus. The vaporized solvent passed through the vent-port and was condensed with a condenser installed before the vacuum pump and cooled to −30° C. to be collected as liquid. The supply of the conjugated diene polymer solution (D) was stopped at a point in time when the above-described operation was continued for 1 hour, and the inner wall of the vent pipe was observed; however, adhesion of the polymer was not observed. The amount ($V_A$) of the solvent collected was 4.0 L, and the ($V_A$)/($V_0$) was 2.0. The amount of the volatilization residue in the P12 was 1.2% by mass, and the gel content was 0.9% by mass.

Example 11

Devolatilization was conducted in the same manner as in Example 9 except that the conjugated diene polymer solution (E) was used as a raw material in place of the conjugated diene polymer solution (D), and the amount of supply was set to 200 Kg per hour. With respect to the motor current value, the $I_0$ was 10.7 A before supplying the sample, the $I_1$ was 19.5 A after supplying the sample, and the $I_1/I_0$ was 1.82. The current was an alternating current with a frequency of 60 Hz. The supply of the conjugated diene polymer solution was stopped at a point in time when the operation was continued for 1 hour, and the inner wall of the vent pipe was observed; however, adhesion of the polymer was not observed. The amount ($V_A$) of the solvent collected was 241 L, and the ($V_A$)/($V_0$) was 30. The amount of the volatilization residue in a conjugated diene polymer (P13) obtained through devolatilization was 0.7% by mass, and gel was not detected.

Example 12

Devolatilization was conducted in the same manner as in Example 9 except that the conjugated diene polymer solution (F) was used as a raw material in place of the conjugated diene polymer solution (D), and the amount of supply was set to 60 Kg per hour. With respect to the motor current value, the $I_0$ was 10.7 A before supplying the sample, the $I_1$ was 11.5 A after supplying the sample, and the $I_1$/$I_0$ was 1.07. The current was an alternating current with a frequency of 60 Hz. The supply of the conjugated diene polymer solution was stopped at a point in time when the operation was continued for 1 hour, and the inner wall of the vent pipe was observed; however, adhesion of the polymer was not observed. The amount ($V_A$) of the solvent collected was 74 L, and the ($V_A$)/($V_0$) was 9.3. The amount of the volatilization residue in a conjugated diene polymer (P14) obtained through devolatilization was 0.6% by mass, and the gel content was 0.3% by mass.

Example 13

Devolatilization was conducted in the same manner as in Example 9 except that the amount of the conjugated diene polymer solution (D) supplied was set to 300 Kg per hour. With respect to the motor current value, the $I_0$ was 10.7 A before supplying the sample, the $I_1$ was 18.0 A after supplying the sample, and the $I_1$/$I_0$ was 1.68. The current was an alternating current with a frequency of 60 Hz. The supply of the conjugated diene polymer solution was stopped at a point in time when the operation was continued for 1 hour, and the inner wall of the vent pipe was observed; however, adhesion of the polymer was not observed. The amount ($V_A$) of the solvent collected was 340 L, and the ($V_A$)/($V_0$) was 43. The amount of the volatilization residue in a conjugated diene polymer (P15) obtained through devolatilization was 25.3% by mass, and gel was not detected.

Subsequently, devolatilization was conducted in the same manner as in Example 10 except that the conjugated diene polymer (P15) was supplied at 120 Kg per hour. With respect to the motor current value, the $I_0$ was 8.3 A before supplying the sample, the $I_1$ was 15.0 A after supplying the sample, and the $I_1$/$I_0$ was 1.81. The current was an alternating current with a frequency of 60 Hz. The supply of the conjugated diene polymer solution was stopped at a point in time when the operation was continued for 1 hour, and the inner wall of the vent pipe was observed; however, adhesion of the polymer was not observed. The amount ($V_A$) of the solvent collected was 31 L, and the ($V_A$)/($V_0$) was 16. The amount of the volatilization residue in a conjugated diene polymer (P16) obtained through devolatilization was 0.5% by mass, and gel was not detected.

Example 14

The biaxial extruder used in Example 10 was directly connected to the apparatus used in Example 9 and including a twin-screw type kneader and a small-sized extruder. The structure was such that the ejection side of the small-sized extruder was directly connected to the side face of the biaxial extruder. The conjugated diene polymer solution (D) was supplied to the twin-screw type kneader at 260 Kg per hour, and the devolatilization treatment was conducted under the same operating condition as in Example 9. With respect to the motor current value of the twin-screw type kneader, the $I_0$ was 10.7 A before supplying the sample, the $I_1$ was 16.5 A after supplying the sample, and the $I_1$/$I_0$ was 1.54. The current was an alternating current with a frequency of 60 Hz. The conjugated diene polymer solution (D) condensed with the twin-screw type kneader was transferred from the twin-screw type kneader to the biaxial extruder through the small-sized extruder. The operating condition of the biaxial extruder was the same as in Example 10. A conjugated diene polymer (P17) in a powder form was discharged from the tip of the biaxial extruder. With respect to the motor current value of the biaxial extruder, the $I_0$ was 8.3 A before supplying the sample, the $I_1$ was 15.2 A after supplying the sample, and the $I_1$/$I_0$ was 1.83. The current was an alternating current with a frequency of 60 Hz. The supply of the conjugated diene polymer solution was stopped at a point in time when the operation was continued for 1 hour, and the inner walls of the vent pipes of the twin-screw type kneader and the biaxial extruder were observed; however, adhesion of the polymer was not observed. The amount ($V_A$) of the solvent devolatilized from the twin-screw type kneader and collected was 298 L, and the ($V_A$)/($V_0$) was 37. The amount ($V_A$) of the solvent devolatilized from the biaxial extruder and collected was 26 L, and the ($V_A$)/($V_0$) was 13. The amount of the volatilization residue in the P17 was 0.2% by mass, and gel was not detected.

Example 15

Devolatilization was conducted in the same manner as in Example 14 except that the conjugated diene polymer solution (G) was used as a raw material in place of the conjugated diene polymer solution (D). With respect to the motor current value of the twin-screw type kneader, the $I_0$ was 10.7 A before supplying the sample, the $I_1$ was 17.5 A after supplying the sample, and the $I_1$/$I_0$ was 1.64. The current was an alternating current with a frequency of 60 Hz. With respect to the motor current value of the biaxial extruder, the $I_0$ was 8.3 A before supplying the sample, the $I_1$ was 16.0 A after supplying the sample, and the $I_1$/$I_0$ was 1.93. The current was an alternating current with a frequency of 60 Hz. The supply of the conjugated diene polymer solution was stopped at a point in time when the operation was continued for 1 hour, and the inner walls of the vent pipes of the twin-screw type kneader and the biaxial extruder were observed; however, adhesion of the polymer was not observed. The amount ($V_A$) of the solvent devolatilized from the twin-screw type kneader and collected was 287 L, and the ($V_A$)/($V_0$) was 36. The amount ($V_A$) of the solvent devolatilized from the biaxial extruder and collected was 32 L, and the ($V_A$)/($V_0$) was 16. The amount of the volatilization residue in the P18 was 0.4% by mass, and gel was not detected.

Example 16

In a twin-screw type kneader with a screw diameter of 200 mm, L/D=9.0, and $V_0$=15.0, the conjugated diene polymer solution (D) was continuously supplied from a supply port at a rate of 500 Kg per hour. At that time, the rotational speeds of the screws and the directions of rotation observed from a motor driving section were 150 rpm and anticlockwise for one of the screws, and 300 rpm and clockwise for the other. The conjugated diene polymer solution (D) was heated while the heat medium oil at 180° C. was supplied to a jacket of the kneader. The vent-port was connected to a vacuum pump through a pipe, and the pressure inside the apparatus was kept at 100 torr. The conjugated diene polymer solution (D) was being condensed while being conveyed with screws, and finally discharged from the small-sized extruder connected to the upper face of the tip of the kneader apparatus, and thus a conjugated diene polymer (P19) in a solid form was obtained. With respect to the motor current value of the twin-screw type kneader, the $I_0$ was 15.2 A before supplying the sample, the $I_1$ was 26.3 A after supplying the sample, and the $I_1/I_0$ was 1.73. The current was an alternating current with a frequency of 60 Hz. The vaporized solvent passed through the vent-port and was condensed with a condenser installed before the vacuum pump and cooled to −30° C. to be collected as liquid. The supply of the conjugated diene polymer solution (D) was stopped at a point in time when the above-described operation was continued for 1 hour, and the inner wall of the vent pipe was observed; however, adhesion of the polymer was not observed. The amount ($V_A$) of the solvent collected was 598 L, and the ($V_A$)/($V_0$) was 40. The solvent in the devolatilized conjugated diene polymer (P19) in a solid form was devolatilized by the above-described operation, and the amount of the volatilization residue in the P19 was 0.7% by mass, and gel was not detected.

Comparative Example 3

Devolatilization was conducted in the same manner as in Example 16 except that the screw diameter, L/D, and $V_0$ of the twin-screw type kneader were adjusted to 100 mm, 6.0, and 8.0, respectively. A tendency that the pressure inside the apparatus gradually increased from 100 torr after 4 minutes from the start of the supply was observed. With respect to the motor current value of the twin-screw type kneader, the $I_0$ was 15.2 A before supplying the sample, the $I_1$ was 33.4 A after supplying the sample, and the $I_1/I_0$ was 2.20. The current was an alternating current with a frequency of 60 Hz. The supply of the conjugated diene polymer solution was stopped at a point in time when the operation was continued for 1 hour, and the inside of the vent pipe was observed to find that the polymer was adhered to the inner wall of the pipe and the pipe was clogged. The polymer which was adhered to the vent pipe and was collected weighed 54 g. The amount ($V_A$) of the solvent collected was 583 L, and the ($V_A$)/($V_0$) was 73. The amount of the volatilization residue in a conjugated diene polymer (P20) obtained through devolatilization was 12.0% by mass, and gel was not detected.

Comparative Example 4

Devolatilization was conducted in the same manner as in Example 10 except that the screw length of the biaxial extruder was changed to adjust the L/D to 20. The supply of the conjugated diene polymer solution was stopped at a point in time when the operation was continued for 1 hour, and the inside of the vent pipe was observed; however, the polymer was not adhered. With respect to the motor current value of the biaxial extruder, the $I_0$ was 12.3 A before supplying the sample, the $I_1$ was 27.2 A after supplying the sample, and the $I_1/I_0$ was 2.21. The current was an alternating current with a frequency of 60 Hz. The amount ($V_A$) of the solvent collected was 5.1 L, and the ($V_A$)/($V_0$) was 2.6. The amount of the volatilization residue in a conjugated diene polymer (P21) obtained through devolatilization was 0.3% by mass, and the gel content was 12% by mass.

The results obtained above are shown together in Table 4 and Table 5.

TABLE 4

| | Example 8 | Example 9 | Example 10 | Example 11 | Example 12 | Example 13 | |
|---|---|---|---|---|---|---|---|
| Conjugated diene polymer solution | (D) | (D) | (D) | (E) | (F) | (D) | (P15) |
| Apparatus having screws | Twin-screw type kneader | Twin-screw type kneader | Biaxial extruder | Twin-screw type kneader | Twin-screw type kneader | Twin-screw type kneader | Biaxial extruder |
| Screw diameter [mm] | 100 | 100 | 50 | 100 | 100 | 100 | 50 |
| L/D | 6.0 | 6.0 | 8.0 | 6.0 | 6.0 | 6.0 | 8.0 |
| Amount of supply [Kg/Hour] | 60 | 100 | 3 | 200 | 60 | 300 | 120 |
| Rotational speed of screw 1 [rpm] | 100 | 150 | 120 | 150 | 150 | 150 | 120 |
| Direction of rotation 1 | Anti-clockwise | Anti-clockwise | — | Anti-clockwise | Anti-clockwise | Anti-clockwise | — |
| Rotational speed of screw 2 [rpm] | 100 | 300 | 120 | 300 | 300 | 300 | 120 |
| Direction of rotation 2 | Anti-clockwise | Clockwise | — | Clockwise | Clockwise | Clockwise | — |
| $I_0$ [A] | 12.0 | 10.7 | 8.3 | 10.7 | 10.7 | 10.7 | 8.3 |
| $I_1$ [A] | 14.0 | 15.3 | 9.2 | 19.5 | 11.5 | 18.0 | 15.0 |
| $I_1/I_0$ | 1.17 | 1.43 | 1.11 | 1.82 | 1.07 | 1.68 | 1.81 |
| Frequency of current [Hz] | 60 | 60 | 60 | 60 | 60 | 60 | 60 |
| $V_0$ [L] | 8.0 | 8.0 | 2.0 | 8.0 | 8.0 | 8.0 | 2.0 |
| $V_A$ [L] | 72 | 120 | 4.0 | 241 | 74 | 340 | 31 |
| $V_A/V_0$ | 9.0 | 15 | 2.0 | 30 | 9.3 | 43 | 16 |
| Temperature of heat medium oil [° C.] | 200 | 180 | 180 | 180 | 180 | 180 | 180 |
| Pressure inside apparatus [Torr] | 100 | 100 | 100 | 100 | 100 | 100 | 100 |
| Position of discharge port | Lower face of tip | Upper face of tip | Tip die | Upper face of tip | Upper face of tip | Upper face of tip | Tip die |
| Discharge port | 70-mm Square port | Small-sized extruder | — | Small-sized extruder | Small-sized extruder | Small-sized extruder | — |
| Conjugated diene polymer | P10 | P11 | P12 | P13 | P14 | P15 | P16 |
| (Evaluation 1) amount of volatilization residue [% by mass] | 0.7 | 0.3 | 1.2 | 0.7 | 0.6 | 25.3 | 0.5 |
| (Evaluation 2) gel content [% by mass] | Not detected | Not detected | 0.9 | Not detected | 0.3 | Not detected | Not detected |

TABLE 4-continued

|  | Example 8 | Example 9 | Example 10 | Example 11 | Example 12 | Example 13 |
|---|---|---|---|---|---|---|
| (Evaluation 3) amount of polymer adhered to vent pipe [g] | 0 | 0 | 0 | 0 | 0 | 0 | 0 |

TABLE 5

|  | Example 14 | | Example 15 | | Example 16 | Comparative Example 3 | Comparative Example 4 |
|---|---|---|---|---|---|---|---|
| Conjugated diene polymer solution | (D) | | (G) | | (D) | (D) | (D) |
| Apparatus having screws | Twin-screw type kneader | Biaxial extruder | Twin-screw type kneader | Biaxial extruder | Twin-screw type kneader | Twin-screw type kneader | Twin-screw type kneader |
| Screw diameter [mm] | 100 | 50 | 100 | 50 | 200 | 100 | 50 |
| L/D | 6.0 | 8.0 | 6.0 | 8.0 | 9.0 | 6.0 | 20 |
| Amount of supply [Kg/Hour] | 260 | — | 260 | — | 500 | 500 | 3 |
| Rotational speed of screw 1 [rpm] | 150 | 120 | 150 | 120 | 150 | 150 | 120 |
| Direction of rotation 1 | Anticlockwise | — | Anticlockwise | — | Anticlockwise | Anticlockwise | — |
| Rotational speed of screw 2 [rpm] | 300 | 120 | 300 | 120 | 300 | 300 | 120 |
| Direction of rotation 2 | Clockwise | — | Clockwise | — | Clockwise | Clockwise | — |
| $I_0$ [A] | 10.7 | 8.3 | 10.7 | 8.3 | 15.2 | 15.2 | 12.3 |
| $I_1$ [A] | 16.5 | 15.2 | 17.5 | 16.0 | 26.3 | 33.4 | 27.2 |
| $I_1/I_0$ | 1.54 | 1.83 | 1.64 | 1.93 | 1.73 | 2.20 | 2.21 |
| Frequency of current [Hz] | 60 | 60 | 60 | 60 | 60 | 60 | 60 |
| $V_0$ [L] | 8.0 | 2.0 | 8.0 | 2.0 | 15.0 | 8.0 | 2.0 |
| $V_A$ [L] | 298 | 26 | 287 | 32 | 598 | 583 | 5.1 |
| $V_A/V_0$ | 37 | 13 | 36 | 16 | 40 | 73 | 2.6 |
| Temperature of heat medium oil [° C.] | 180 | 180 | 180 | 180 | 180 | 180 | 180 |
| Pressure inside apparatus [Torr] | 100 | 100 | 100 | 100 | 100 | 100 | 100 |
| Position of discharge port | — | Tip die | — | Tip die | Upper face of tip | Upper face of tip | Tip die |
| Discharge port | — | — | — | — | Small-sized extruder | Small-sized extruder | — |
| Conjugated diene polymer | P17 | | P18 | | P19 | P20 | P21 |
| (Evaluation 1) amount of volatilization residue [% by mass] | 0.2 | | 0.4 | | 0.7 | 12.0 | 0.3 |
| (Evaluation 2) gel content [% by mass] | Not detected | | Not detected | | Not detected | Not detected | 12 |
| (Evaluation 3) amount of polymer adhered to vent pipe [g] | 0 | | 0 | | 0 | 54 Clogging of pipe | 0 |

The present application is based on Japanese Patent Application No. 2014-183614 filed on Sep. 9, 2014 to the Japan Patent Office and Japanese Patent Application No. 2014-254933 filed on Dec. 17, 2014 to the Japan Patent Office, the contents of which are incorporated herein by reference.

The invention claimed is:

1. A process for producing a conjugated diene polymer, the process comprising:
   a production step of producing a conjugated diene polymer solution comprising a conjugated diene polymer and a solvent; and
   a devolatilization step of heating the conjugated diene polymer solution while conveying the conjugated diene polymer solution with an apparatus comprising rotary twin screws, thereby devolatilizing the solvent,
   wherein a motor current value of the screw in the devolatilization step and a motor current value of the screw under no load satisfy following relational expression (1):

$$1.05 \leq ((I_1)/(I_0)) \leq 2.00 \quad (1)$$

wherein $I_1$ represents the motor current value [A] of the screw in the devolatilization step and $I_0$ represents the motor current value [A] of the screw under no load,
wherein:
   a ratio of a screw length to a screw diameter in the apparatus is 4.0 or more and 12 or less; and,
   in the devolatilization step, an inner volume of the apparatus and an amount of the solvent volatilizing per unit time satisfy following relational expression (2):

$$1.0 \leq ((V_A)/(V_0)) \leq 50 \quad (2)$$

wherein $(V_0)$ represents the inner volume [L] of the apparatus and $(V_A)$ represents the amount [L] of the solvent volatilizing per unit time [h].

2. The process for producing the conjugated diene polymer according to claim 1, wherein the conjugated diene polymer has a weight average molecular weight of 100,000 or higher and 2,000,000 or lower.

3. The process for producing the conjugated diene polymer according to claim 1, wherein the conjugated diene polymer solution comprises 5.0% by mass or more and 95% by mass or less of the conjugated diene polymer based on the total amount of the conjugated diene polymer solution.

4. The process for producing the conjugated diene polymer according to claim 1, wherein the conjugated diene polymer solution comprises 5.0 parts by mass or more and 100 parts by mass or less of oil based on 100 parts by mass of the conjugated diene polymer.

5. The process for producing the conjugated diene polymer according to claim 1, wherein two or more of apparatuses each comprising twin screws are used in the devolatilization step.

6. The process for producing the conjugated diene polymer according to claim 1, wherein the conjugated diene polymer comprises 1.0% by mass or more and 99% by mass or less of a component having a molecular weight of 1000000 or higher based on the total amount of the conjugated diene polymer.

7. The process for producing the conjugated diene polymer according to claim 1, wherein an average residence time in the devolatilization step is 10 seconds or longer and 300 seconds or shorter.

8. The process for producing the conjugated diene polymer according to claim 1, wherein the devolatilization step is a step of devolatilizing the solvent until the content of the solvent reaches 5.0% by mass or less based on the total amount of the conjugated diene polymer obtained.

9. The process for producing the conjugated diene polymer according claim 1, wherein the conjugated diene polymer is modified with a compound having at least one functional group selected from the group consisting of epoxy groups and alkoxysilyl groups.

10. The process for producing the conjugated diene polymer according to claim 9, wherein the compound is at least one compound selected from the group consisting of compounds represented by following general formula (3) and compounds represented by following general formula (4):

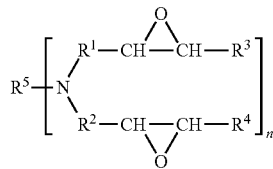

(3)

wherein $R^1$ and $R^2$ each independently represent an alkyl group having 1 to 10 carbon atoms or an alkyl group having 1 to 10 carbon atoms and having at least one functional group selected from the group consisting of ether groups and tertiary amine groups, $R^3$ and $R^4$ each independently represent a hydrogen atom, an alkyl group having 1 to 20 carbon atoms, or an alkyl group having 1 to 20 carbon atoms and having at least one functional group selected from the group consisting of ether groups and tertiary amine groups, $R^5$ represents an alkyl group having 1 to 20 carbon atoms or an alky group having 1 to 20 carbon atoms and having at least one functional group selected from the group consisting of ether groups, tertiary amine groups, epoxy groups, carbonyl groups and halogens, and n represents an integer of 1 to 6; and

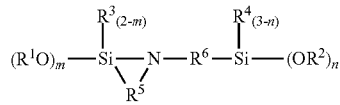

(4)

wherein $R^1$ and $R^2$ each independently represent an alkyl group having 1 to 20 carbon atoms or an aryl group having 6 to 20 carbon atoms, $R^3$ and $R^4$ each independently represent an alkyl group having 1 to 20 carbon atoms, $R^5$ represents an alkyl group having 1 to 6 carbon atoms and forms a five or more-membered cyclic structure with an adjacent nitrogen atom and an adjacent silicon atom, $R^6$ represents an alkyl group having 1 to 20 carbon atoms, an alkyl group having 1 to 20 carbon atoms, not having an active hydrogen atom, and substituted with a heteroatom, or an organo-substituted silyl group, m represents an integer of 1 or 2, and n represents an integer of 2 or 3.

11. The process for producing the conjugated diene polymer according to claim 1, wherein the conjugated diene polymer has a weight average molecular weight of 100,000 or higher and 2,000,000 or lower, the conjugated diene polymer solution comprises 5.0% by mass or more and 95% by mass or less of the conjugated diene polymer based on the total amount of the conjugated diene polymer solution, the conjugated diene polymer solution comprises 5.0 parts by mass or more and 100 parts by mass or less of oil based on 100 parts by mass of the conjugated diene polymer, two or more of apparatuses each comprising twin screws are used in the devolatilization step, the conjugated diene polymer comprises 1.0% by mass or more and 99% by mass or less of a component having a molecular weight of 1000000 or higher based on the total amount of the conjugated diene polymer, an average residence time in the devolatilization step is 10 seconds or longer and 300 seconds or shorter, the devolatilization step is a step of devolatilizing the solvent until the content of the solvent reaches 5.0% by mass or less based on the total amount of the conjugated diene polymer obtained, and the conjugated diene polymer is modified with a compound having at least one functional group selected from the group consisting of epoxy groups and alkoxysilyl groups.

12. The process for producing the conjugated diene polymer according to claim 2, wherein the conjugated diene polymer solution comprises 5.0 parts by mass or more and 100 parts by mass or less of oil based on 100 parts by mass of the conjugated diene polymer.

13. The process for producing the conjugated diene polymer according to claim 2, wherein two or more of apparatuses each comprising twin screws are used in the devolatilization step.

14. The process for producing the conjugated diene polymer according to claim 3, wherein two or more of apparatuses each comprising twin screws are used in the devolatilization step.

* * * * *